(12) United States Patent
Jenkins et al.

(10) Patent No.: US 7,915,374 B2
(45) Date of Patent: Mar. 29, 2011

(54) COPOLYESTERS HAVING IMPROVED THERMAL STABILITY AND METHODS FOR MAKING THEM

(75) Inventors: Jason Christopher Jenkins, Kingsport, TN (US); Gary Wayne Connell, Church Hill, TN (US); Howard Smith Carman, Jr., Blountville, TN (US); Douglas Weldon Carico, Jr., Kingsport, TN (US); Jimmy Ray Trotter, Kingsport, TN (US); Alan Wayne White, Kingsport, TN (US); Mary Therese Jernigan, Kingsport, TN (US); Rodney Scott Armentrout, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 73 days.

(21) Appl. No.: 12/430,470

(22) Filed: Apr. 27, 2009

(65) Prior Publication Data
US 2010/0273956 A1 Oct. 28, 2010

(51) Int. Cl.
*C08G 63/00* (2006.01)
*C08G 63/02* (2006.01)

(52) U.S. Cl. ........ 528/180; 428/379; 428/458; 428/534; 524/100; 524/116; 524/117; 524/119; 524/403; 524/413; 524/440; 524/604; 524/605; 528/271; 528/272; 528/279; 528/294; 528/295.5

(58) Field of Classification Search .................. 428/379, 428/458, 534; 524/100, 116, 117, 119, 403, 524/413, 440, 604, 605; 528/271, 272, 279, 528/294, 295.5
See application file for complete search history.

(56) References Cited

U.S. PATENT DOCUMENTS

| | | | |
|---|---|---|---|
| 5,558,912 A | 9/1996 | Fagerburg et al. | |
| 5,681,918 A | 10/1997 | Adams et al. | |
| 5,998,028 A | 12/1999 | Eckart et al. | |
| 6,156,867 A | 12/2000 | Aoyama et al. | |
| 7,521,523 B2 * | 4/2009 | Jenkins et al. | 528/272 |
| 2007/0066735 A1 * | 3/2007 | Quillen et al. | 524/404 |
| 2007/0066791 A1 * | 3/2007 | Jernigan et al. | 528/272 |
| 2008/0027206 A1 | 1/2008 | Jenkins | |
| 2008/0161465 A1 * | 7/2008 | Jenkins et al. | 524/403 |
| 2008/0161472 A1 * | 7/2008 | Jenkins et al. | 524/440 |
| 2008/0161529 A1 * | 7/2008 | Jenkins et al. | 528/272 |
| 2008/0188602 A1 * | 8/2008 | Jernigan | 524/414 |

FOREIGN PATENT DOCUMENTS

WO WO 2008/082468 A1 7/2008

OTHER PUBLICATIONS

Billmeyer, Fred et al.; "Chapter 2: Describing Color"; Principles of Color Technology; pp. 25-66; 1981; John Wiley & Sons.
Notification of Transmittal of the International Search Report and the Written Opinion of the International Searching Authority, or the Declaration date of mailing Aug. 2, 2010 received in corresponding International Application No. PCT/US2010/001080.

\* cited by examiner

*Primary Examiner* — Terressa M Boykin
(74) *Attorney, Agent, or Firm* — Michael K. Carrier; Bernard J. Graves, Jr.

(57) ABSTRACT

Processes for producing polyethylene terephthalate copolyesters are disclosed, that include the steps of:
  esterifying a mixture of at least terephthalic acid, from 20 mole percent to 45 mole percent 1,4-cyclohexanedimethanol, and ethylene glycol, optionally in the presence of one or more alkaline earth metals or alkali metals, to form an oligomer;
  polycondensing the oligomer in the melt phase in the presence of aluminum and one or more alkaline earth metals or alkali metals, to obtain a copolyester having an intrinsic viscosity of at least 0.5 dL/g; and
  thereafter adding to the copolyester a phosphorus-containing compound.

22 Claims, No Drawings

COPOLYESTERS HAVING IMPROVED THERMAL STABILITY AND METHODS FOR MAKING THEM

FIELD OF THE INVENTION

This invention relates to polyester polymers, and more particularly, to polyethylene terephthalate copolyesters comprising at least terephthalic acid, ethylene glycol, and 1,4-cyclohexanedimethanol, prepared using a catalyst system comprising aluminum and one or more alkaline earth metals or alkali metals, which is afterward deactivated with one or more phosphorus compounds.

BACKGROUND OF THE INVENTION

Polyester resins, and polyethylene terephthalate copolyesters in particular, may suffer from thermal instability, as evidenced for example by bubble formation when maintained at the relatively high temperatures needed for extrusion, and the like. This bubble formation, and other defects seen during thermal processing, result at least in part from the presence of off-gas in the form of $CO_2$ and CO. This thermal instability is a function both of the thermal processing temperature and the length of time the polymer is kept at an elevated temperature. These bubbles, when present, may be observed by the naked eye, and lead to streaks in molded and molded articles and films. Color and clarity are both important for copolyesters intended for demanding applications such as signage, and a copolyester product ideally exhibits both high clarity and low yellowing.

To control the yellow hue, polyester polymers may be prepared using small amounts of titanium catalysts and low reaction temperatures. However, the resulting polymers may still be yellower than the intended use will allow, as evidenced by their b* values.

Yet another problem with polyethylene terephthalate copolyesters is that unintended diethylene glycol is produced during polymer production, which is then incorporated into the growing polymer chain. This DEG level may vary significantly during a production run, resulting in a copolyester having inconsistent or undesired properties.

U.S. Pat. No. 5,558,912 discloses a photo-stabilized polymer blend comprising: at least one polyethylene terephthalate-based (PET) copolymer comprising 1,4-cyclohexanedimethanol and, as an ultraviolet absorber, at least one compound selected from the group consisting of cyclic imino esters.

U.S. Pat. No. 5,681,918 discloses a three step process for preparing copolyesters exhibiting a neutral hue, high clarity, and increased brightness. The process involves reacting terephthalic acid, ethylene glycol, and 1,4-cyclohexanedimethanol in a feed mole ratio of total glycols to dicarboxylic acid of 1.7:1 to 6.0:1, at a temperature of 240° C. to 280° C., and a pressure of 15 psig to 80 psig, to form an esterification product; adding a polycondensation catalyst selected from titanium, germanium, antimony, and combinations thereof, and a toner; and polycondensing the product at a temperature of 260° C. to 290° C. and a reduced pressure to form a high molecular weight copolyester. The use of titanium as a polycondensation catalyst is exemplified.

U.S. Pat. No. 6,156,867 discloses a polyester polymerization catalyst, comprising a solution containing an aluminum compound and an alkali compound, with water or an organic solvent or a mixture consisting of water and an organic solvent as the medium. Also disclosed is a polyester production method, in which the product obtained by an esterification reaction or ester interchange reaction between an aromatic dicarboxylic acid or any of its ester forming derivative and a diol is polycondensed, to produce a polyester, comprising the use of the polymerization catalyst containing an aluminum compound. The catalyst is said to provide a polyester excellent in processability and to overcome such problems as spinneret contamination, filtration pressure rise, filament breaking, film breaking and foreign matter production in the production process of products such as fibers, films, resins and bottles.

U.S. Pat. Publn. No. 2007/0066735 discloses a polyester composition containing: a) aluminum atoms; and b) alkaline earth atoms or alkali metal atoms or alkali compound residues such as lithium atoms; and c) particles comprising titanium, zirconium, vanadium, niobium, hafnium, tantalum, chromium, tungsten, molybdenum, iron, or nickel atoms or combinations thereof, where the particles improve the reheat rate of the polyester composition. The polyester polymer compositions may also contain phosphorus catalyst deactivators/stabilizers.

U.S. Pat. Publn. No. 2007/0066791 discloses a polyester polymer composition containing polyester polymers such as polymers having repeating ethylene terephthalate units, aluminum atoms in an amount of at least 3 ppm based on the weight of the polymer, the polyester polymers having an It.V. of at least 0.72 dL/g obtained through a melt phase polymerization and a residual acetaldehyde level of 10 ppm or less. Also provided are polyester polymer compositions containing polyester polymers and: (i) aluminum atoms (ii) alkaline earth metal atoms or alkali metal atoms or alkali compound residues, and (iii) a catalyst deactivator such as a phosphorus compound. The phosphorus compound is added to the polyester melt either late in the polycondensation or upon remelting a solid polyester polymer. The polyester polymer exhibits good L* brightness, clarity, and low levels of acetaldehyde generated upon melting.

U.S. Pat. Publn. No. 2008/0027206 discloses a process for feeding metals to one or more melt phase process lines for the production of polyester polymers in which two feed streams of different types or amounts of metals are provided so that the metals can be added to the process at different points, and so that the amount or ratio of metals provided to the process can be varied over time. The document discloses that adding lithium within the esterification zone, or at least before 50% conversion, will reduce the diethylene glycol (DEG) or DEG residue content in the polyester polymer produced by the melt phase process.

It would be desirable to provide a copolyesters made using a highly active catalyst system that has improved thermal stability during processing, is less yellow as evidenced by a lower b* value, and may have reduced diethylene glycol levels, if desired.

SUMMARY OF THE INVENTION

In one aspect, the invention relates to processes for producing polyethylene terephthalate copolyesters that include the steps of:

esterifying a mixture of at least terephthalic acid, from 20 mole percent to 45 mole percent 1,4-cyclohexanedimethanol, and ethylene glycol, optionally in the presence of one or more alkaline earth metals or alkali metals, to form an oligomer;

polycondensing the oligomer in the melt phase, in the presence of aluminum and one or more alkaline earth metals or alkali metals, to obtain a copolyester having an intrinsic viscosity of at least 0.5 dL/g; and thereafter adding to the copolyester a phosphorus-containing compound.

DETAILED DESCRIPTION OF THE INVENTION

The present invention may be understood more readily by reference to the following detailed description of the invention and to the examples provided. It is to be understood that this invention is not limited to the specific processes and conditions described, except when explicitly so stated, because specific processes and process conditions for processing plastic articles may vary. It is further understood that although the various embodiments may achieve one or more advantages, for example reduced diethylene glycol levels, the claimed invention is not restricted to those advantages, nor need all the advantages be obtained in every instance.

As used in the specification and the claims, the singular forms "a," "an," "the", and "metal" include plural referents unless the context clearly dictates otherwise. For example, reference to processing a thermoplastic "preform," "container" or "bottle" includes the processing of a plurality of thermoplastic preforms, articles, containers, or bottles. Processing at a temperature or using a catalyst includes one or multiple temperatures or catalysts.

By "comprising" or "containing" we mean that at least the named compound, element, particle, etc. is present in the composition or article, but does not exclude the presence of other compounds, materials, particles, etc., even if the other such compounds, material, particles, etc. have the same function as what is named.

By "atoms" as used in conjunction, for example, with a transition metal, we mean the transition metal atom occupying any oxidation state, any morphological state, any structural state, and any chemical state, whether as added to or as present in the polymer or composition of matter. Thus, the word "metal" as used throughout does not imply an oxidation state, and a metal may occupy any oxidation state. However, by "elemental" we mean that the transition metal occupies a zero oxidation state.

The intrinsic viscosity (It.V.) values described throughout this description are set forth in dL/g unit as calculated from the inherent viscosity (Ih.V.) measured at 25° C. in 60/40 wt/wt phenol/tetrachloroethane. The inherent viscosity is calculated from the measured solution viscosity. The following equations describe these solution viscosity measurements, and subsequent calculations to Ih.V. and from Ih.V. to It.V:

$$\eta_{inh} = [\ln(t_S/t_O)]/C$$

where $\eta inh$=Inherent viscosity at 25° C. at a polymer concentration of 0.5 g/100 mL of 60% phenol and 40% 1,1,2,2-tetrachloroethane by weight
ln=Natural logarithm
$t_S$=Sample flow time through a capillary tube
$t_O$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} (\ln \eta_r)/C$$

where $\eta_{int}$=Intrinsic viscosity
$\eta_r$=Relative viscosity=$t_S/t_O$
$\eta_{sp}$=Specific viscosity=$\eta_r - 1$ Instrument calibration involves triplicate testing of a standard reference material and then applying appropriate mathematical equations to produce the "accepted" Ih.V. values. The three values used for calibration shall be within a range of 0.010; if not, correct problems and repeat testing of standard until three consecutive results within this range are obtained.

Calibration Factor=Accepted Ih.V. of Reference Material/Average of Triplicate Determinations The uncorrected inherent viscosity ($\eta_{inh}$) of each sample is calculated from the Viscotek Model Y501 Relative Viscometer using the following equation:

$$\eta_{inh} = [\ln(P_2/KP_1)]/C$$

where $P_2$=The pressure in capillary $P_2$
$P_1$=The pressure in capillary $P_1$
ln=Natural logarithm
K=Viscosity constant obtained from baseline reading
C=Concentration of polymer in grams per 100 mL of solvent The corrected Ih.V., based on calibration with standard reference materials, is calculated as follows:

Corrected Ih.V.=Calculated Ih.V.×Calibration Factor

The intrinsic viscosity (It.V. or $\eta_{int}$) may be estimated using the Billmeyer equation as follows:

$$\eta_{int} = 0.5[e^{0.5 \times Corrected\ Ih.V.} - 1] + (0.75 \times Corrected\ Ih.V.)$$

Alternatively, the It.V. can be measured using the above solvents and concentrations measured according to ASTM D 5225-98 using a differential viscometer to measure IV.

When we say that the polyester compositions of the invention have reduced yellowness, we mean that the resulting compositions appear to be less yellow, or more blue, or both, or that the b* value, as measured using the tristimulus CIE L*a*b* scale, as further described herein, is lower than it would be, for example, using a catalyst such as titanium. For example, the b* value may be lowered by at least 1 unit, or at least 2 units, or at least 3 units.

The "polyesters," "polyester polymers," and "polyethylene terephthalate copolyesters" according to the invention are thermoplastic polyester polymers comprising at least terephthalic acid, ethylene glycol, and 1,4-cyclohexanedimethanol. Polyester thermoplastic polymers of the invention are distinguishable from liquid crystal polymers and thermosetting polymers because they have no appreciable ordered structure while in the liquid (melt) phase, they can be remelted and reshaped into a molded article, and because the liquid crystal polymers and thermosetting polymers are unsuitable for the intended applications such as packaging, sheets, and containers.

The polyester polymers are desirably random polymers such that the monomer units in the polymer chain are randomly arranged rather than arranged in a block fashion.

When we say that the copolyesters of the invention are "comprised" of a given mole percentage of a dicarboxylic acid or a diol (also called a glycol), we mean that the copolyesters have polymerized therein the residue of the acid or diol, the reaction product (water or glycol) having been removed. Thus, the copolyester comprising the diacid or diol is intended to mean that the copolyester has polymerized therein the residue of the diacid or diol.

Thus, when we say that a copolyester according to the invention is comprised of 50 mole percent residues of a given diol, we mean that half of the diol residues of the copolyester are from that diol, and that one or more additional diols comprise the other 50 mole percent. When we say that a copolyester may be comprised of 100 mole percent terephthalic acid residues, we mean that substantially all of the dicarboxylic acid residues of the copolyester are derived from terephthalic acid. Thus, the total amount of diols in the copolyesters of the invention total 100 mole percent, and the total amount of dicarboxylic acids in the copolyesters likewise comprise 100 mole percent.

When we say, for example, that a metal is provided in an amount of ppm or parts per million, unless indicated otherwise, we mean that the metal is added in an amount so as to obtain the stated ppm in the copolyester obtained. Thus, for example, when we say that lithium may be present during esterification in an amount from 2 ppm to 20 ppm, we mean that lithium is present in an amount so as to provide from 2 ppm to 20 ppm in the copolyester obtained. If additional lithium is provided, for example, during polycondensation, then the amount added, or the total amount if so stated, is sufficient to provide the stated amount in the copolyester obtained.

In one aspect, the invention relates to processes for producing polyethylene terephthalate copolyesters that include the steps of: esterifying a mixture of at least terephthalic acid, from 20 mole percent to 45 mole percent 1,4-cyclohexanedimethanol, and ethylene glycol, optionally in the presence of one or more alkaline earth metals or alkali metals, to form an oligomer; polycondensing the oligomer in the melt phase, in the presence of aluminum and one or more alkaline earth metals or alkali metals, to obtain a copolyester having an intrinsic viscosity of at least 0.5 dL/g; and thereafter adding to the copolyester a phosphorus-containing compound.

In one aspect, the amount of terephthalic acid in the esterifying step is at least 95 mole percent, or at least 99 mole percent.

In another aspect the amount of 1,4-cyclohexanedimethanol in the esterifying step may be from 25 mole percent to 40 mole percent.

In yet another aspect, the amount of diethylene glycol in the copolyester is no greater than 2 mole percent, or no greater than 1 mole percent.

In a further aspect, the one or more alkaline earth metals or alkali metals are present in the esterifying step in an amount to provide from 2 ppm to 20 ppm, or from 3 ppm to 10 ppm, alkaline earth metal or alkali metal atoms in the copolyester obtained.

In yet another aspect, the aluminum may be present in the polycondensing step in an amount from 3 ppm to 150 ppm, or from 5 ppm to 100 ppm, in each case based on the weight of the copolyester obtained.

In a further aspect, the aluminum may be provided as aluminum isopropoxide. In yet another aspect, the aluminum and the one or more alkaline earth metals or alkali metals are provided to the polycondensing step as a mixture of aluminum isopropoxide and lithium hydroxide monohydrate.

In a further aspect, the one or more alkaline earth metals or alkali metals comprise lithium, present in the polycondensing step in an amount from 4 ppm to 300 ppm, or in an amount from 6 ppm to 150 ppm, in each case the amount stated being that necessary to obtain the stated range in the copolyester obtained.

In yet another aspect, the phosphorus-containing compound may be added to the copolyester in an amount from 10 ppm to 300 ppm, or from 20 ppm to 200 ppm, in each case the amount stated being that necessary to obtain the stated range in the copolyester obtained.

In a further aspect, the phosphorus-containing compound may be added to the copolyester when the intrinsic viscosity of the copolyester is at least 0.6 dL/g.

In yet another aspect, the phosphorus-containing compound may be added to the copolyester in an amount such that the mole ratio of the phosphorus to the total amount of the aluminum and the alkaline earth metals and the alkali metals in the copolyester is from 0.5:1 to 5:1.

In further aspects, the phosphorus-containing compound may be phosphoric acid, or tris(nonylphenyl)phosphite.

In yet another aspect, the invention relates to polyethylene terephthalate copolyesters produced by a process that includes the steps of esterifying a mixture of at least terephthalic acid, from 20 mole percent to 45 mole percent 1,4-cyclohexanedimethanol, and ethylene glycol, optionally in the presence of one or more alkaline earth metals or alkali metals, to form an oligomer; polycondensing the oligomer in the melt phase, in the presence of aluminum and one or more alkaline earth metals or alkali metals, to obtain a copolyester having an intrinsic viscosity of at least 0.5 dL/g; and thereafter adding to the copolyester a phosphorus-containing compound.

In yet another aspect, the invention relates to molded articles made from such polyethylene terephthalate copolyesters.

In one aspect, the polyethylene terephthalate copolyesters according to the invention may thus comprise at least 90 mole percent residues from terephthalic acid, or at least 95 mole percent terephthalic acid, or at least 97 mole percent terephthalic acid, or at least 99 mole percent terephthalic acid, or 100 mole percent terephthalic acid, based on the entire amount of dicarboxylic acids totaling 100 mole percent; from about 55 mole percent to about 80 mole percent residues of ethylene glycol, or from 60 mole percent to 75 mole percent ethylene glycol; and from 20 mole percent to 45 mole percent residues of 1,4-cyclohexane-dimethanol, or from 25 mole percent to 40 mole percent 1,4-cyclohexanedimethanol, in each case based on the entire amount of diols totaling 100 mole percent.

The invention of the present application thus includes a step of esterifying a mixture of at least terephthalic acid, ethylene glycol, and 1,4-cyclohexanedimethanol, optionally in the presence of one or more alkaline earth metals or alkali metals, for example lithium, to form an oligomer. This esterifying step may be accomplished, for example, by reacting a ratio of total glycols to dicarboxylic acid of from 1:1 to 6.0:1 to form an esterification product, or oligomer. Alternatively, the feed mole ratio may be from 2.0:1 to 4.5:1. The 1,4-cyclohexanedimethanol may be, for example, either a cis- or trans-isomer, or mixtures of the two isomers.

The 1,4-cyclohexanedimethanol is typically added in an amount approximately equal to the mole percent desired in the final copolyester product, and the excess glycol in the reactant charge will include ethylene glycol. Thus, if the mole percentage of 1,4-cyclohexanedimethanol desired in the copolyester is about 30 mole percent, then the amount provided to the mixture would be about 30 mole percent, with the amount of ethylene glycol in excess of 70 mole percent, determined according to the ratios set out above, so that the amount of 1,4-cyclohexanedimethanol residues incorporated in the copolyesters will be about 30 mole percent.

The dicarboxylic acid component containing terephthalic acid may optionally be modified with minor amounts, for example up to 10 mole percent, of another dicarboxylic acid, or as otherwise provided herein. Optional dicarboxylic acids include aromatic dicarboxylic acids having 8 to 14 carbon atoms, aliphatic dicarboxylic acids having 4 to 12 carbon atoms, and cycloaliphatic dicarboxylic acids 8 to 12 carbon atoms. Combinations of dicarboxylic acids may also be used.

Specific examples of dicarboxylic acids other than terephthalic acid are isophthalic acid, naphthalenedicarboxylic acid, cyclohexanedicarboxylic acid, stilbenedicarboxylic acid, succinic acid, glutaric acid, adipic acid, and azelaic acid.

The glycol component comprising ethylene glycol and 1,4-cyclohexane-dimethanol may optionally be modified with minor amounts, for example up to 10 mole percent, of one or more additional diols. Such additional diols include cycloaliphatic diols having 6 to 20 carbon atoms or aliphatic diols having 3 to 20 carbon atoms. Examples include: triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The copolyesters may also include two or more of the above diols.

In one aspect, diethylene glycol, in addition to that formed during polymerization, may be added to the polyesters of the invention, for example, when a consistent diethylene glycol content is desired. In this aspect, the amount of diethylene glycol formed during the reaction may be measured, and additional DEG added so as to maintain a consistent amount of DEG in the copolyester. The amount of diethylene glycol in the polyesters of the invention may thus be no more than 10 mole percent, or no more than 5 mole percent, or no more than 3 mole percent, or no more than 2 mole percent, or no more than 1 mole percent.

The copolyesters of this invention may also contain small amounts of trifunctional or tetrafunctional comonomers such as trimellitic anhydride, trimethylolpropane, and pentaerythritol.

The esterifying step may be conducted, for example, at a temperature from about 240° C. to about 280° C., and at a pressure, for example, from about 15 psig to about 80 psig. Alternatively, the esterification step may be conducted at a temperature from 240° C. to 260° C., or from 245° C. to 255° C. Alternatively, the esterification may be conducted at a pressure of 20 psig to 50 psig. Reaction times for the esterification step may vary from about 100 to 300 minutes, or from 120 minutes to 250 minutes, depending upon the selected temperatures, pressures, and feed mole ratios of glycol to dicarboxylic acid.

The esterifying step may be carried out in the presence of one or more alkaline earth metals or alkali metals, for example lithium. If provided, for example, as lithium hydroxide, the lithium may reduce the amount of diethylene glycol formed during esterification, and thus the amount of diethylene glycol in the copolyester. The amount of the one or more alkaline earth metals or alkali metals provided in the esterifying step may vary from about 1 ppm to about 50 ppm, or from about 2 to about 20 ppm, or from 3 to 10 ppm, in each case the amount of lithium provided during esterification is such that the amount of lithium in the copolyester obtained is within the stated range.

The esterification reaction can be conducted batchwise, or in a series of continuous reactors. Reactants are typically introduced to the esterification reactor as a slurry of terephthalic acid in the glycols, although separate addition of each reactant can also be used.

The esterification reaction, when conducted according to the reaction parameters specified, results in an esterification product with sufficient polycondensation activity. The use of feed mole ratios lower than those specified may result in an esterification product with diminished activity in the subsequent polycondensation reaction. The enhanced polycondensation activity of the esterification product, when prepared with feed mole ratios in the range specified, may permit the use of lower catalyst levels and milder temperatures in the subsequent polycondensation reaction.

Following the esterification step, the oligomer obtained is polycondensed in the melt phase in the presence of aluminum and one or more alkaline earth metals or alkali metals, added together, to obtain a copolyester having an intrinsic viscosity of at least 0.5 dL/g.

The polycondensation catalyst thus comprises aluminum and one or more alkaline earth metals or alkali metals, which are added together to the oligomer in or prior to the polycondensing step, in addition to any alkaline earth metals or alkali metals present from the esterification step. The polycondensation step may be conducted at a temperature, for example, from about 260° C. to about 290° C., or from 270° C. to 280° C. The polycondensation reaction is typically conducted under reduced pressure of 400 mm Hg to 0.1 mm Hg, and the by product glycol is removed as evolved.

The molecular weight of the copolyester obtained is indicated by a measure of the solution inherent viscosity (I.V.), which may be measured at 25° C. by dissolving 250 mg of copolyester in 50 ml of a solvent consisting of a 60/40 weight ratio of phenol and tetrachloroethane. The copolyesters of this invention may have an inherent viscosity, for example, from 0.5 to 0.9 dL/g, or from 0.7 to 0.8 dL/g.

Once the copolyester having an intrinsic viscosity of at least 0.5 dL/g is obtained, or at least 0.55 dL/g, or at least 0.6 dL/g, or at least 0.65 DI/g, a phosphorus-containing compound is added to the copolyester, for example phosphoric acid or tris(nonylphenyl)phosphite, in order to deactivate the catalyst.

The dicarboxylic acid component may contain, for example, up to about 10 mole percent or up to about 5 mole percent, of one or more dicarboxylic acids other than terephthalic acid, but do not include esters and acid chlorides that are sometimes considered suitable equivalents, for example dimethyl terephthalate. We have found that the reaction of diesters with glycols may not be sufficiently catalyzed by the catalyst system describe herein.

The polyesters of the invention preferably have an inherent viscosity of 0.4 to 1.5 dL/g, preferably 0.5 to 0.9 dL/g. Copolyesters containing substantially only ethylene glycol, 1,4-cyclohexanedimethanol, and terephthalic acid may be preferred.

The copolyesters may thus have an inherent viscosity in the range of 0.5 to 1.2 dL/g when measured at 25° C. using 0.50 grams of polymer per 100 ml of a solvent which consists of 60% by weight phenol and 40% by weight tetrachloroethane. The copolyesters utilized in the thermoplastic article of the present invention may have an inherent viscosity of 0.6 to 0.9 dL/g (measured as described herein) and may consist of terephthalic acid residues, ethylene glycol residues, and 1,4-cyclohexanedimethanol residues.

The polyester polymer is thus at least a terpolymer of terephthalic acid, ethylene glycol, and 1,4-cyclohexanedimethanol, but may contain other residues in relatively minor amounts. Thus, the amount of terephthalic acid residues in the polyesters of the invention may be at least 70 mole percent, or at least 75 mole percent, or at least 80 mole percent, or at least 90 mole percent, or as disclosed elsewhere herein.

Although the polyesters of the invention typically include ethylene glycol and CHDM, such that the total moles of the two diols is substantially 100 mole percent, the polyesters of the invention may include minor amounts of additional diols, as already described.

The copolyesters of the invention thus comprise residues of terephthalic acid, ethylene glycol, and CHDM, and:
 a) aluminum atoms; and
 b) alkaline earth atoms or alkali metal atoms; and
 c) one or more phosphorus-containing compounds.

There is also provided a composition comprising polyester polymers obtained by polycondensing a polyester polymer melt comprising terephthalic acid, ethylene glycol, and CHDM in the presence of aluminum atoms and at least one of alkaline earth metal atoms or alkali metal atoms, to obtain a copolyester having an intrinsic viscosity of at least 0.5 dL/g.

In addition, there is also provided a process for the manufacture of a copolyester comprising polycondensing a polyester polymer melt in the presence of aluminum atoms and at least one of alkaline earth metal atoms or alkali metal.

Representative uses for the copolyesters of the invention include sheets; medical packaging; signs for businesses, both stationary mounted and portable ones; luggage carriers for the tops of vehicles; sign boards; marquees on stores; solar roof panels; skylights; highway sound barriers; greenhouse panels, both in the sidewalls and the roofing thereof; separation walls in aquariums, and aquariums themselves; recreational vehicle windows and vents; windshields for snowmobiles, jet skis, golf carts, motorcycles, and other such recreation vehicles; bug screens or air deflection screens on cars and trucks or other such vehicles; transparent or translucent awnings; formed letters to be applied to the sides of buildings; letters to be used on signs, particularly those where the letters are changed at some frequency; airport runway and taxiway marker signs; multiwall sheeting for use in signs, greenhouses, glazing applications and fluorescent or other light covers; facia for soft drink and juice dispensing machines, and the like. In these applications, the product can be used either as a clear plastic part or colored to give a clear, colored sheet, or printed applied to the back, in particular for sign and marquee applications to give the desired effects of highlighting letters, for example.

In each of the copolyesters and processes for producing them, aluminum atoms and an alkaline earth metal or alkali metal are present.

The aluminum atom is present in the polyester polymer, and its oxidation, morphological, structural, or chemical state is not limited. Suitable detection methods for the presence of aluminum include inductively coupled plasma emission spectroscopy (ICP-OES) or atomic absorption spectroscopy.

Aluminum may be added to the melt phase polycondensation process as a compound (which includes a salt or a complex), or as a metal, so long as it is ultimately active as a catalyst in the polycondensation phase when added in combination with the alkali metal or alkaline earth metal atoms. It is desirable to select an aluminum compound which can be dissolved in a diluent or a carrier reactive with the polyester forming ingredients. Aluminum oxides are not included within the meaning of an aluminum compound or metal because they are insoluble and have little if any catalytic activity in the melt phase polycondensation step. Suitable liquid reactive carriers can have any molecular weight, such as those ranging from 62 to about 10,000 grams per mole. Aluminum compounds can also be added as slurries or suspensions in a liquid that is volatile and/or reactive with the polyester forming ingredients.

Preferred aluminum compounds include aluminum compounds with at least one organic substituent. Illustrative examples of suitable compounds include those of the formula:

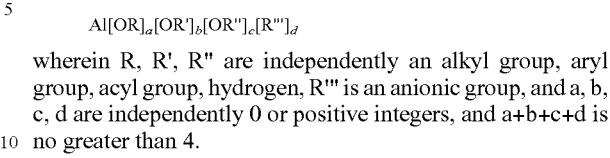

wherein R, R', R" are independently an alkyl group, aryl group, acyl group, hydrogen, R'" is an anionic group, and a, b, c, d are independently 0 or positive integers, and a+b+c+d is no greater than 4.

Suitable examples of aluminum compounds include the carboxylic acid salts of aluminum such as aluminum acetate, aluminum benzoate, aluminum lactate, aluminum laurate, aluminum stearate, aluminum alcoholates such as aluminum ethylate, aluminum isopropylate, aluminum tri n-buryrate, mono-sec-butyrate, aluminum tri-tert-butyrate, mono-sec-butyoxyaluminum diisoprpylate, and aluminum chelates in which the alkoxy group of an aluminum alcoholate is partially or wholly substituted by a chelating agents such as an alkyl acetoacetate or acetylacetone such as ethyl acetaoacetate aluminum diisopropylate, aluminum tris(ethyl acetate), alkyl acetoacetate aluminum diisopropylate, aluminum monoacetylacetate bis(ethyl acetoacetate), aluminum (tris (acetyl acetate), aluminum acetylacetonate.

Suitable among the aluminum compounds are the basic carboxylic acid salts of aluminum and aluminum alcoholates. Basic carboxylic acid salts of aluminum include monobasic and dibasic compounds. The basic aluminum acetate used can be either the diacetate monohydroxy compound or the monoacetate dihydroxy compound or a mixture thereof. In particular, basic aluminum acetate and aluminum isoproxide are preferred aluminum compounds. Stabilizing basic aluminum acetate with boric acid increases its solubility; however, stabilization increases cost. Aluminum isopropoxide is preferred on a cost basis.

The amount of aluminum needed to effect polycondensation generally ranges from at least 3 ppm, or at least 5 ppm, or at least 10 ppm, or at least 15 ppm, or at least 20 ppm, or at least 30 ppm, and up to about 150 ppm, or up to about 100 ppm, or up to about 75 ppm, or up to about 60 ppm, Al based on the weight of the polymer.

An alkaline earth metal residue or alkali residue is the alkali or alkaline earth atoms present in the polyester polymer, or if an alkali compound is used, then the residual remainder of the alkali compound present within the polymer melt or the finished polymer or article. Their oxidation states or ultimate physical, morphological, structural, or chemical states are not limited. The word "alkali" or "alkaline earth metal" or "metal" includes the atom in its elemental state or in an oxidation state corresponding to its allowable valences in its Periodic group. The chemical state of the alkali upon addition is also not limited. The alkali may be added as a metal compound, organometallic compound, or as a compound without a metal. Likewise, the chemical state of the alkaline earth compound upon addition is not limited.

The alkali metals and alkaline earth metals include the metals in Group IA and Group IIA of the periodic table, including lithium, sodium, potassium, rubidium, cesium, magnesium, calcium, strontium, and preferably lithium, sodium or potassium. If rapid rates are the primary concern, lithium may be preferred. If color is the primary concern, sodium may be preferred. The metals may be added to the melt phase as metal compounds (which includes a complex or a salt) having counterions, among which the preferred ones are hydroxides, carbonates, and carboxylic acids.

Other suitable alkali compounds include those mentioned in U.S. Pat. No. 6,156,867, the disclosure of which is fully incorporated herein by reference. They include the tertiary amine compounds and the quaternary ammonium compounds.

The amount of alkaline earth metal or alkali metal is effective to increase the molecular weight of the polymer melt at a reasonable rate. The amount generally ranges from at least about 4 ppm, or at least 6 ppm, or at least 10 ppm, or at least 15 ppm, or at least 20 ppm, or at least 25 ppm, or at least 50 ppm, or at least 75 ppm, and up to about 400 ppm, or up to about 300, or up to 250 ppm or up to 150 ppm, or up to about 100 ppm, or up to about 75 ppm, based on the weight of the polymer.

The particular amount used by weight will vary by the type of alkali or alkaline earth metal used, since their atomic or molecular weights vary widely, and by the amount of aluminum employed. Increasing the aluminum level increases the rate; therefore, low M:Al molar ratios (MR) may give a reasonable rate with moderate to high aluminum levels while giving slow rates at low aluminum levels. The molar ratio of the alkaline earth metal or alkali:aluminum (M:Al MR) is desirably 0.5 to 6, or 1 to 5, or 2 to 4. The amount of the alkaline earth metal or alkali metal is determined by the aluminum level and the M:Al MR selected. The particular amount used by weight will vary by the aluminum and M:Al MR targets and the type of alkali metal or alkaline earth metal used, since their atomic or molecular weights vary widely. The preferred range of M:Al MR is 2 to 6, and the most preferred range is 2 to 4.

High catalyst loadings may impact the solubility of the catalysts, which in turn may increase the haze level of the polymer. However, an advantageous feature of one embodiment of the invention lies in that the late addition of a deactivator such as a phosphorus compound reduces the haze level even at high catalyst loadings. Therefore, there is also provided a polyester composition containing phosphorus atoms and a metal content of at least 60 ppm, or at least 70 ppm, or at least 80 ppm, or at least 90 ppm, based on the cumulative weight of aluminum, alkaline earth metals and alkali metals, based on the weight of the polyester polymer. The amount of phosphorus is desirably at a mole ratio of P:M (all metals of aluminum and alkaline earth metals and alkali metals) within a range of 0.5:1 to 5:1.

Typical amounts of phosphorus atoms provided to the polyester will be at least 10 ppm, or at least 20 ppm, or at least 30 ppm, or at least 50 ppm, up to 75 ppm, or up to 100 ppm, or up to 150 ppm, or up to 200 ppm, or up to 300 ppm, in each case based on the weight of the copolyester.

The solution haze values of these polymers at high catalyst loadings can be as low as 30 ntu or less, or 20 ntu or less, or 15 ntu or less, or 10 ntu or less. The relative reduction of haze by addition of phosphorus may be as large as 40% or more, or 50% or more, or 60% or more, relative to the same polymer made without phosphorus.

The molar ratio of the alkaline earth metal or alkali:aluminum is desirably 0.5 to 6, or 1 to 5, or 2 to 5.

The various ways in which aluminum, the alkaline earth metal or alkali can be added, their order of addition, and their points of addition are further described below.

The aluminum and alkali or alkaline earth metals may be added as a solution, fine dispersion, a paste, a slurry, or neat. They are preferably added as a liquid, a melt, or a free flowing solid which can be metered. Most preferably they are added as a liquid, and in particular as a liquid solution or dispersion.

The copolyester precursor reactants are fed to an esterification reaction vessel where the first stage of the process is conducted. The esterification process proceeds by direct esterification. In the second stage of the process, the oligomer mixture formed during esterification is polycondensed to form a copolyester melt. The molecular weight of the copolyester melt continues to be increased in the melt phase process to the desired IV.

To further illustrate, a mixture of at least terephthalic acid, ethylene glycol, and CHDM, is continuously fed to an esterification reactor operated at a temperature of between about 200° C. and 300° C., and at a pressure from about 1 psig up to about 70 psig. The residence time of the reactants typically ranges from between about one and five hours. Normally, the dicarboxylic acid(s) is directly esterified with diol(s) at elevated pressure and at a temperature of about 240° C. to about 285° C. The esterification reaction is continued until an acid or ester group conversion of at least 70% is achieved, but more typically until an acid or ester group conversion of at least 85% is achieved to make the desired oligomeric mixture (or otherwise also known as the "monomer").

The reaction to make the oligomeric mixture by the direct esterification method is conducted in the presence of one or more alkaline earth metals or alkali metals, for example lithium.

Once the oligomeric mixture is made to the desired percent conversion of the acid or ester groups, it may be transported from the esterification zone or reactors to the polycondensation zone. The commencement of the polycondensation reaction is generally marked by either a higher actual operating temperature than the operating temperature in the esterification zone, or a marked reduction in pressure compared to the esterification zone, or both. In some cases, the polycondensation reaction is marked by higher actual operating temperatures and lower (usually sub-atmospheric) pressures than the actual operating temperature and pressure in the esterification zone. Typical polycondensation reactions occur at temperatures ranging from about 260° C. and 300° C., and at sub-atmospheric pressure of between about 350 mmHg to 0.2 mm Hg. The residence time of the reactants typically ranges from between about 2 to about 6 hours. In the polycondensation reaction, a significant amount of glycols are evolved by the condensation of the oligomeric ester species and during the course of molecular weight build up.

In some processes, polycondensation reactions are initiated and continued in the melt phase in a prepolymerization zone and finished in the melt phase in a finishing zone, after which the melt is solidified to form the polyester polymer melt phase product, generally in the form of chips, pellets, or any other shape. Each zone may comprise a series of one or more distinct reaction vessels operating at different conditions, or the zones may be combined into one reaction vessel using one or more sub-stages operating at different conditions in a single reactor.

That is, the prepolymer stage can involve the use of one or more reactors operated continuously, one or more batch reactors, or even one or more reaction steps or sub-stages performed in a single reactor vessel. The residence time of the melt in the finishing zone relative to the residence time of the melt in the prepolymerization zone is not limited. For example, in some reactor designs, the prepolymerization zone represents the first half of polycondensation in terms of reaction time, while the finishing zone represents the second half of polycondensation. Other reactor designs may adjust the residence time between the finishing zone to the prepolymerization zone at about a 1.5:1 ratio or higher. A common distinction between the prepolymerization zone and the finishing zone in many designs is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

Desirably, the temperature applied to the polymer melt or of the polymer melt in the polycondensation zone is greater than 270° and up to about 300° C. The pressure in the finishing zone may be within the range of about 0.2 to 20 mm Hg, or 0.2 to 10 mm Hg, or 0.2 to 2 mm Hg.

During polycondensation, the aluminum and the one or more alkaline earth metals or alkali metals are added in combination as a unitary stream. The alkaline earth metal or alkali compounds and the aluminum compounds may be combined together into a solution with a solvent such as ethylene glycol. Adding the aluminum and alkaline earth metal or alkali metal together in solution as a unitary stream provides the convenience of reducing the number of addition points.

As noted, the addition of lithium compounds to the esterification reaction zone lowers the diethylene glycol content in the resulting polyester polymer. Therefore, a portion of the lithium or other alkali metal or alkaline earth metal compounds may be added to the esterification step. However, to avoid potential undesirable side reactions between aluminum catalyst and water generated in the esterification zone which may inhibit or deactivate the aluminum catalyst and thereby slow down the rate of polycondensation, the aluminum compounds are added together with at least a portion of the lithium or other alkali metal or alkaline earth metal compounds after substantial completion of the esterification reaction or at the beginning of or during polycondensation. In a further embodiment, at least 75%, or at least 85%, or at least 95% of the esterification reaction (in terms of conversion) is conducted in the absence of added aluminum compounds.

In one embodiment, the esterification process is conducted in the presence of an alkaline earth metal or alkali metal. The alkaline earth metal or alkali metal compounds are added to an esterification reaction mixture. The alkaline earth metal or alkali metal compounds may be added at the initiation of esterification, to the first esterification reactor as a separate stream, in mixture with the terephthalic acid paste, or preferably in combination with the feed of ethylene glycol or other diol to the esterification reactor. The alkaline earth metal or alkali metal compound is preferably added to the diol tank and fed to the esterification reactor in solution.

The benefit of conducting esterification in the presence of an alkaline earth metal or alkali metal is a lower level of DEG in the oligomer leaving the esterification zone. A lower level of DEG in the oligomer results in a lower level of DEG in the polymer. The DEG level in the polymer affects performance during stretch-blow molding, crystallization behavior and the glass transition temperature (Tg). In general, lower DEG levels are desirable. Lowering DEG provides a larger processing window during stretch-blow molding. It also maintains a higher Tg, which is generally desired for extruded sheet and injection molding applications.

The amount of alkaline earth metal or alkali metal is effective to increase the rate of esterification, thereby acting as a catalyst or promoter.

The alkaline earth metal or alkali metal compounds may be added to the esterification zone before, during, or after completion of esterification, or between the esterification zone and polycondensation zone, or at a point when polycondensation starts. In one embodiment, the alkaline earth metal or alkali metal compounds are added before 50% conversion of the esterification reaction mixture. In general, addition of the basic alkali metal compounds or basic alkaline earth metal compounds early in the esterification zone results in the lowest DEG levels. The DEG level may also be related to the amount added of the basic alkali metal compounds or basic alkaline earth metal compounds; however, low levels may be sufficient. In another embodiment where lowering DEG levels is not a goal, the alkaline earth metal or alkali metal is added between the esterification and prepolymerization zones or at the beginning of the prepolymerization zone.

In the process of the invention, the copolyester is formed by polycondensing the oligomer mixture in the combined presence of aluminum compounds or atoms and the one or more alkaline earth metals or alkali metals. The one or more alkaline earth metals or alkali metals and the aluminum may be added together to the esterification reaction mixture, to the oligomer mixture exiting the esterification zone, or at the start of polycondensation, or to the polyester melt during polycondensation. However, since aluminum operates as a polycondensation catalyst, it is desirable to add the combination to the copolyester melt early in the polycondensation reaction to provide the benefit of shorter reaction times or a higher molecular weight build up. We have found that aluminum compounds can react with water present in the esterification zone. This results in a less active catalyst in the polycondensation zone. Therefore, the combination is added preferably when the percent conversion of the acid end groups is at least 75%, more preferably when the percent conversion of the acid end groups is at least 85%, and most preferably when the percent conversion of the acid end groups is at least 95%.

In a preferred embodiment, the combination of the aluminum and the one or more alkaline earth metals or alkali metals is added to the oligomer mixture upon or after completion of esterification or to the copolyester melt no later than when the IV of the melt reaches 0.3 dL/g, or no later than when the IV of the melt reaches 0.2 dL/g, and more preferably to the oligomer mixture or prior to commencing or at the start of polycondensation.

Other catalyst metals may be present if desired. For example, Mn, Zn, Sb, Co, Ti, and Ge catalysts may be used in conjunction with aluminum and alkaline earth metals or alkali catalysts. Titanium catalysts can be used, particularly if melt phase manufacture involves ester exchange reactions. The titanium catalysts are those compounds added in amounts which increase the It.V. of polyester melt by at least 0.3 dL/g if not deactivated. Typically, the titanium catalyst added during ester exchange will be deactivated prior to polycondensing the resulting oligomer mixture since, left untreated before polycondensing, the titanium catalyst will severely discolor the polymer due to its high activity, which includes side reactions. However, if desired, small quantities of active titanium catalysts may be present with the catalyst system of the invention. The amount of titanium catalyst, if used, generally ranges from 2 ppm to 15 ppm, based on the weight of the polymer. Antimony catalysts can also be used in combination with the catalyst system of the invention. The amount of antimony can range from 20 ppm to 300 or to 250 ppm. Due to acetaldehyde generation concerns, the amount of antimony used may in some cases be no greater than 125 ppm, based on the weight of the polymer. Furthermore, it is preferred not to use antimony catalyst because they are known to degrade the L* and clarity of the polyester. It may be necessary to increase the amount of phosphorus if catalytic metals other than aluminum, alkaline earth metals, or alkali metals are present.

Preferably, the polyester polymer is made without the addition of titanium catalysts, cobalt catalysts, antimony catalysts, or any other polycondensation or esterification catalyst metal added to or present in the melt phase reaction in amounts which are effective to catalyze (increase the reaction rate or increase the It.V. by at least 0.1 dL/g), and more preferably, the polyester polymer is made without the addition of any catalyst metal to the melt phase reaction other than the aluminum/alkaline earth or alkali system. It is to be recognized, however, that one or more of metals such as cobalt or manganese will most likely be present at low levels in the polymer because they come as impurities with the terephthalic acid composition made from a metal catalyzed liquid phase oxidation process. Metal impurities present in the raw material supply to the melt phase process are not considered to be metals added to the melt phase process unless present in quantities sufficient to catalyze the reaction.

The polyester polymer also contains one or more phosphorus-containing compounds as a catalyst deactivator. By a catalyst deactivator is meant a compound effective to at least partially deactivate or inhibit the activity of the catalyst system. A compound is effective to at least partially deactivate the catalyst system when by its addition at a given level, and solely for testing the effectiveness of a compound at a given level, when both a) the rate of solid-stating is reduced relative to the same polymer without the deactivator ("no additive case") and b) when added earlier, the rate of melt-phase polycondensation to a constant It.V. target is reduced or the It.V. of the polymer is reduced at constant time relative to the no additive case.

The phosphorus-containing compound is added relatively late during manufacture of the polymer melt in order to limit the activity of the catalyst system during subsequent melt processing steps and which might otherwise catalyze the conversion of acetaldehyde precursors present in the polymer to acetaldehyde, or other undesirable reactions. Left untreated, the polymer might, for example, have a high acetaldehyde generation rate during extrusion or injection molding.

The phosphorus-containing compound can also help thermally stabilize the polymer melt near the end of melt phase polycondensation and during remelting which occurs, for example, during melt processing into articles, without which more reactions would occur to cleave the polymer chains in the highly viscous melt. In addition to lowering the formation rate of AA precursors, the phosphorus-containing compound may improve the hydrolytic stability of the polymer. Any side reaction at least partially catalyzed by the polycondensation catalyst system may be less of a problem when the polycondensation catalyst system is at least partially deactivated, resulting, for example, in improved thermal stability.

The phosphorus-containing compound is not added along with the addition of aluminum compounds or alkaline earth metal or alkali metal compounds, nor is it added at the commencement of polycondensation, because it would inhibit the rate of polycondensation and the catalytic activity of the metal catalysts. It should be noted, however, that not all types or forms of phosphorus compounds are deactivators, and if they are not, they may, if desired, be added along with the catalyst or at the commencement of polycondensation.

Phosphorus-containing compounds useful according to the invention are those suitable as deactivator compounds. The phosphorus compounds are those containing one or more phosphorus atoms. Preferred are acidic phosphorus compounds having at least one oxyphosphorus acid group, that is, at least one phosphorus atom double-bonded to one oxygen and single-bonded to at least one hydroxyl or OH group.

We have found that phosphoric acid and tris(nonylphenyl) phosphite are effective catalyst deactivators.

Specific examples of phosphorus-containing compounds include phosphoric acid, phosphorous acid, polyphosphoric acid, carboxyphosphonic acids, phosphonic acid derivatives, and each of their acidic salts and acidic esters and derivatives, including acidic phosphate esters such as phosphate mono- and di-esters and non acidic phosphate esters (e.g. phosphate tri-esters) such as trimethyl phosphate, triethyl phosphate, tributyl phosphate, tributoxyethyl phosphate, tris(2-ethylhexyl) phosphate, oligomeric phosphate tri-esters, trioctyl phosphate, triphenyl phosphate, tritolyl phosphate, (tris)ethylene glycol phosphate, triethyl phosphonoacetate, dimethyl methyl phosphonate, tetraisopropyl methylenediphosphonate, mixtures of mono-, di-, and tri-esters of phosphoric acid with ethylene glycol, diethylene glycol, and 2-ethylhexanol, or mixtures of each. Other examples include distearylpentaerythritol diphosphite, mono-, di-, and trihydrogen phosphate compounds, phosphite compounds, certain inorganic phosphorus compounds such as monosodium phosphate, zinc or calcium phosphates, poly(ethylene)hydrogen phosphate, silyl phosphates; phosphorus compounds used in combinations with hydroxy- or amino-substituted carboxylic acids such as methyl salicylate, maleic acid, glycine, or dibutyl tartrate; each useful for inactivating metal catalyst residues.

Specific examples of preferred acidic phosphorus compounds include phosphoric acid, phosphorous acid, polyphosphoric acid, carboxyphosphonic acids, phosphonic acid derivatives, and each of their acidic salts and acidic esters and derivatives, including acidic phosphate partial esters such as phosphate mono- and di-esters of any of the foregoing acids. Preferred examples of non-acidic phosphorus compounds include oligomeric phosphate tri-esters, (tris)ethylene glycol phosphate, tri-esters of phosphoric acid with ethylene glycol, diethylene glycol, or mixtures of each.

Tris(nonylphenol)phosphite is also suitable for use according to the invention as a catalyst deactivator, and may be preferred when a slight molecular weight build is desired, or when some antioxidant capacity is desired.

Other phosphorus compounds which may be added include the amine salts of phosphorus-containing acids. The amines may be cyclic or acyclic, may be monomeric, oligomeric, or polymeric, and should be selected so as to minimize haze and/or solubility. The organic constituents of the amine may in principle be any organic group. Ammonia and related compounds like ammonium hydroxide are suitable.

Other suitable compounds are those disclosed and claimed in U.S. Pat. Publn. No. 2007/0066791, the relevant disclosure of which is incorporated herein by reference in its entirety.

Since the catalyst system used in the invention can be so easily at least partially deactivated, phosphorus compounds previously found to be unsuitable with antimony catalyzed systems, such as the partial or full esters of acidic phosphorus compounds, can now be used in the polymer melt and process of the invention. Moreover, phosphorus compounds found to cause an increase in haze with antimony catalyzed systems, such as phosphorous acid, can also now be used in the catalyst system without acting to increase the haze due to reduction of a metal to a gray or black color.

The quantity of phosphorus used in this process may be an amount that is effective to reduce the amount of AA generated upon remelting the polymer produced in the melt phase by partially or fully deactivating the aluminum/alkaline earth metal or alkali catalyst, or an amount that is effective to prevent or reduced discoloration upon further processing and polymer drying. Consideration is taken for the cumulative amount of aluminum, alkali or alkaline earth metals, and any other catalyst metals present in the melt. The molar ratio of the moles of phosphorus to the total moles of aluminum and alkaline earth metal or alkali metal (P:M MR where M is deemed to be the cumulative molar total of aluminum, alkaline earth metals, and alkali metals) is generally at least 0.1:1, or at least 0.3:1, or at least 0.5:1, or at least 0.7:1, or at least 1:1, and up to about 5:1, or more preferably up to about 3:1, or up to 2:1, or up to 1.8:1, or up to 1.5:1. Excessively large quantities of phosphorus compounds should be avoided to minimize the loss in polymer It.V. upon addition of the phosphorus compound to the polyester melt. A typical range for P:M MR is 0.5 to 1.5.

In an embodiment of the invention, the polyester polymer composition contains aluminum atoms within a range of 10 ppm to 100 ppm, or 15 to 80 ppm, or 20 ppm to 60 ppm, based on the weight of the polyester polymer, and the moles of alkaline earth metal or alkali metal or alkali atoms divided by the moles of aluminum atoms may be within a range of 0.5 to 6, or 1 to 5, or 2 to 4, and the P:M ratio may range from 0.1 to 3, or 0.3 to 2, or 0.5 to 1.5. Preferably, the polyester polymer composition contains aluminum and at least one of lithium or sodium or a combination of both.

Since one of the benefits of the invention is the ease with which the catalyst system may be deactivated, care should be taken not to add the phosphorus compound too early as this would retard the polycondensation rate. The addition of the final amount of desired phosphorus should be completed only upon substantial completion of polycondensation and thereafter, and preferably, the final amount of desired phosphorus compound should not be added to the polymer melt in the melt phase manufacturing process until substantial completion of the polycondensation or thereafter.

In the embodiments in which the phosphorus compounds are added in the melt phase polymerization, by the final amount of phosphorus is meant the final amount of phosphorus desired in the polyester polymer exiting the melt phase manufacturing process or as appearing in a pellet. If desired, a partial amount of phosphorus compound may be added early in the melt phase manufacturing process, such as at the initiation of polycondensation, provided that a portion of phosphorus representing the final amount is added late in the course of polycondensation or thereafter but before solidification as explained further below.

To minimize It.V. loss if large quantities of phosphorus are added, or to further minimize the potential It.V. loss even if moderate or optimal quantities of phosphorus are added, it may be desirable to add the phosphorus compound neat, that is without further dilution, such as in the case of 85% or more phosphoric acid. If a carrier is used, it is preferred that the carrier is nonreactive, that is, does not break the polymer chain nor increase AA generation rates. Water, alcohols, glycols and lower molecular weight PET are known to break the polymer chain. Once the minimum amount of the phosphorus compound and the associated It.V. loss are known, the melt-phase process can be carried out such that the It.V, made before deactivation/stabilization, is higher by the amount of It.V. loss expected so that the target ItV. can be achieved.

In one embodiment where the phosphorus compound is added to a melt phase polymerization process, the catalyst stabilizer is added to the polyester melt late during the course of polycondensation and before solidification. The deactivator is added to the polyester melt late in the course of the polycondensation reaction when one or more of the following conditions are satisfied or thereafter and before solidification of the polyester melt:

a) the polyester melt reaches an It.V. of at least 0.52 dL/g or b) vacuum applied to the polyester melt, if any, is released, or c) if the polyester melt is present in a melt phase polymerization process, adding the phosphorus compound within a final reactor for making the polyester polymer or between the final reactor and before a cutter for cutting the polyester melt, or d) if the polyester melt is present in a melt phase polymerization process, following at least 85% of the time for polycondensing the polyester melt; or e) the It.V. of the polyester melt is within +/−0.15 dl/g of the It.V. obtained upon solidification; or f) at a point within 20 minutes or less of solidifying the polyester melt.

Thus, the deactivator may be added to the polyester melt after the polyester melt obtains an It.V. of at least 0.50 dL/g, or at least 0.55 dL/g, or at least 0.60 dL/g, or at least 0.65 dL/g, or at least 0.68 dL/g, or at least 0.70 dL/g, or at least 0.72 dL/g or at least 0.76 dL/g, or at least 0.78 dL/g, and most preferably, regardless of when the deactivator is added, the resulting polymer exiting the melt phase manufacture has an It.V. of at least 0.60 dl/g.

In another embodiment, the phosphorus-containing compound is added to the polyester melt during or after releasing the vacuum from the polyester melt undergoing polycondensation reactions, or after bringing the pressure in a polycondensation zone or reactor to a level of 300 mm Hg or greater, or 450 mm Hg or greater, or 600 mm Hg or greater, or to atmospheric pressure or greater, and preferably before the polyester melt is solidified.

In another embodiment, the phosphorus-containing deactivator is added at a location near or at the end of a final reactor or between the final reactor and before a cutter. For example, the deactivator may be added to the last polycondensation reactor at a location proximal to the outlet of the last polycondensation reactor, or to a pipe connecting directly or indirectly the last polycondensation reactor and a gear pump or extruder providing the motive force to drive the melt through a die plate for cutting wherein said pipe is directed back to or proximal to the outlet or the bottom of the last polycondensation reactor, or to a pipe inlet to the last polycondensation reactor.

In yet another embodiment, the deactivator is added to the copolyester melt following at least 85%, or at least 90%, or at least 95%, or at least 98%, or about 100% of the polycondensation time. The polycondensation time is measure as the time elapsed between the start of polycondensation zone to the exit of the polyester melt from the last polycondensation reactor.

In a further embodiment, the deactivator is added to the polyester melt when the It.V. of the polyester melt is within 0.10 dL/g, or within 05 dl/g, or within 0.030 dL/g, or within 0.02 of the It.V. obtained upon solidification.

Stabilizing or deactivating the catalyst late or near the end of a melt phase process can result in polyester particles that, in the absence of AA scavengers, generate less AA during subsequent melt processing. With late addition of a phosphorus compound, Al/alkaline earth metal or alkali catalyst systems can produce polyester polymers with lower AA generation rates than polyester polymers made without the presence of a catalyst deactivator/stabilizer or polyesters made with conventional antimony catalysts that are similarly deactivated late with a phosphorus compound.

Especially, at higher Al levels and/or higher alkaline earth metal or alkali metal levels, the late addition of a phosphorus compound to the polyester melt significantly decreases particulate haze in the polymer, resulting in a molded article with better clarity. Since higher Al levels and/or higher alkaline earth metal or alkali metal levels in PET increase production rates, late addition of a phosphorus compound facilitates maximizing production rates while minimizing haze.

The melt phase product is processed to a desired form, such as amorphous pellets. The shape of the polyester polymer pellets is not limited, and can include regular or irregular shaped discrete pellets without limitation on their dimensions, including stars, spheres, spheroids, globoids, cylindrically shaped pellets, conventional pellets, pastilles, and any other shape, but pellets are distinguished from a sheet, film, preforms, strands or fibers.

The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt is optionally filtered to remove large particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers, and centrifuged pelletizers.

The presence of a catalyst can be determined if the molecular weight, or It.V. of the polymer melt is increased relative to the absence of the compound in the polymer melt under identical conditions. Thus, polyester polymers made in the melt phase having acceptable color can be isolated and provided to a converter without the need for increasing their molecular weight in the solid state. By making the high It.V. product in the melt phase, the solid stating step can be altogether avoided. Solid stating is used for increasing the molecular weight (and the It.V) of the pellets in the solid state, usually by at least 0.05 It.V. units, and more typically from 0.1 to 0.5 It.V. units. Typically, the It.V. of solid stated polyester solids ranges from 0.70 dL/g to 1.15 dL/g.

The particles of the invention are directly or indirectly packaged as a bulk into shipping containers, which are then shipped to customers or distributors. It is preferred to subject the particles to any process embodiment described herein without solid state polymerizing the particles at any point prior to packaging the particles into shipping containers. With the exception of solid state polymerization, the particles may be subjected to numerous additional processing steps in-between any of the expressed steps.

In one embodiment, there is provided finished polyester polymer particles having an average It.V. of at least 0.68 dL/g, or at least 0.70 dL/g, or at least 72 dL/g, or at least 0.74 dL/g, or at least 0.76 dL/g obtained in a melt phase, wherein said particles comprise the compositions stated herein.

The polymer particles may contain polyester polymers, aluminum atoms in an amount of at least 5 ppm, or at least 10 ppm, or at least 15 ppm, or at least 20 ppm based on the weight of the polymers, alkaline earth metal or alkali metals in an amount of at least 25 ppm, and phosphorus atoms in an amount of at least 30 ppm, and optionally titanium atoms in an amount of at least 5 ppm.

Articles can be formed from the melt phase products by any conventional techniques known to those of skill. For example, melt phase products, optionally solid state polymerized, are fed to a machine for melt extruding and injection molding the melt into shapes such as preforms suitable for stretch blow molding into beverage or food containers, or rather than injection molding, merely extruding into other forms such as sheet. Suitable processes for forming the articles are known and include extrusion, extrusion blow molding, melt casting, injection molding, a melt to mold process, stretch blow molding (SBM), thermoforming, and the like.

Examples of the kinds of shaped articles which can be formed from the melt phase products and the polyester polymer composition of the invention include sheet; film; packaging and containers such as preforms, bottles, jars, and trays; rods; tubes; lids; and filaments and fibers. Beverage bottles suitable for holding water or carbonated beverages, and heat-set beverage bottles suitable for holding beverages which are hot filled into the bottles, are examples of the types of bottles which are made from the pellet of the invention.

The copolyesters of this invention may also, optionally, contain color stabilizers, such as certain cobalt compounds. These cobalt compounds can be added as cobalt acetates or cobalt alcoholates (cobalt salts or higher alcohols). They can be added as solutions in ethylene glycol. Polyester resins containing high amounts of the cobalt additives can be prepared as a masterbatch for extruder addition. The addition of the cobalt additives as color toners is a process used to minimize or eliminate the yellow color, measured as b*, of the resin. Other cobalt compounds such as cobalt aluminate, cobalt benzoate, cobalt chloride and the like may also be used as color stabilizers. Alternatively, the processes of the invention may be carried out in the absence of color stabilizers.

It is also possible to add certain diethylene glycol (DEG) inhibitors to reduce or prevent the formation of DEG in the final resin product. Preferably, a specific type of DEG inhibitor would comprise a sodium acetate-containing composition to reduce formation of DEG during the esterification and polycondensation of the applicable diol with the dicarboxylic acid or hydroxyalkyl, or hydroxyalkoxy substituted carboxylic acid. It is also possible to add stress crack inhibitors to improve stress crack resistance of bottles, or sheeting, produced from this resin. Alternatively, the processes of the invention may be carried out in the absence of DEG inhibitors other than the alkaline earth metals or alkali metals.

Specific uses for the polyester polymers of the invention include preforms to make bottles, preformed trays, preformed cups, and the like, which are heated and drawn to form the final product. Yet another use relates to polyester yarn or filaments or fiber which is forced through a plurality of spinnerets having an infrared quench collar thereabout. Additionally, the present invention is applicable to highly transparent, clear and yet low haze powdered coatings wherein a desired transparent film or the like is desired.

Sheet-related uses include those already mentioned, such as in signs for businesses, both stationary mounted and portable ones; luggage carriers for the tops of vehicles; sign boards; marquees on stores; solar roof panels; skylights; highway sound barriers; greenhouse panels, both in the sidewalls and the roofing thereof; separation walls in aquariums, and aquariums themselves; recreational vehicle windows and vents; windshields for snowmobiles, jet skis, golf carts, motorcycles, and other such recreation vehicles; bug screens or air deflection screens on cars and trucks or other such vehicles; transparent or translucent awnings; formed letters to be applied to the sides of buildings; letters to be used on signs, particularly those where the letters are changed at some frequency; airport runway and taxiway marker signs; multiwall sheeting for use in signs, greenhouses, glazing applications and fluorescent or other light covers; facia for soft drink and juice dispensing machines, and the like. In these applications, the product can be used either as a clear plastic part or colored to give a clear, colored sheet, or printed applied to the back, in particular for sign and marquee applications to give the desired effects of highlighting letters, for example.

Color measurement theory and practice are discussed in greater detail in *Principles of Color Technology*, pp. 25-66 by Fred W. Billmeyer, Jr., John Wiley & Sons, New York (1981), incorporated herein by reference.

L* values for the copolyesters of the invention discussed herein should generally be greater than 45, or at least 60, or at least 65, or at least 70, or at least 75, or at least 78, or at least 80, or at least 85. Specifying a particular L* brightness does not imply that a preform having a particular sidewall cross-sectional thickness is actually used, but only that in the event the L* is measured, the polyester composition actually used is, for purposes of testing and evaluating the L* of the composition, injection molded to make a preform having a thickness of 0.154 inches.

The color of a desirable polyester composition is generally indicated by an a* coordinate value preferably ranging from about minus 4.4 to plus 1.6, or minus 2.0 to about plus 0.5 or from about minus 2.0 to about plus 0.1. With respect to a b* coordinate value, it is generally desired to make a bottle preform having a b* value coordinate ranging from −8.6 to +10.2, or from −3.0, or from −1.5, to a positive value of less than 5.0, or less than 4.0, or less than 3.8, or 3.0 or less, or 2.6 or less. These color values are as indicated on the polyester in any form, whether amorphous pellets ground to a powder passing a 300 mesh, or on a preform or bottle sidewall. In a preferred embodiment, these color values are as measured on a twenty-ounce bottle preforms having a nominal sidewall cross-sectional thickness of 0.154 inches.

The measurements of L*, a* and b* color values are conducted according to the following method. The instrument used for measuring b* color should have the capabilities of a HunterLab UltraScan XE, model U3350, using the CIE Lab Scale (L*, a*, b*), D65 (ASTM) illuminant, 10° observer and an integrating sphere geometry. Clear plaques, films, preforms, and bottles are tested in the transmission mode under ASTM D1746 "Standard Test Method for Transparency of Plastic Sheeting." The instrument for measuring color is set up under ASTM E1164 "Standard Practice for Obtaining Spectrophotometric Data for Object-Color Evaluation."

More particularly, the following test methods can be used, depending upon whether the sample is a preform, or a bottle. Color measurements should be performed using a HunterLab UltraScan XE (Hunter Associates Laboratory, Inc., Reston Va.), which employs diffuse/8° (illumination/view angle) sphere optical geometry, or equivalent equipment with these same basic capabilities. The color scale employed is the CIE L*a*b* scale with D65 illuminant and 100 observer specified.

Preforms having a mean outer diameter of 0.846 inches and a wall thickness of 0.154 inches are measured in regular transmission mode using ASTM D1746, "Standard Test Method for Transparency of Plastic Sheeting". Preforms are held in place in the instrument using a preform holder, available from HunterLab, and triplicate measurements are averaged, whereby the sample is rotated 90° about its center axis between each measurement.

A variety of other articles can be made from the polyester compositions of the invention, including sheet, film, bottles, trays, other packaging, rods, tubes, lids, fibers, and injection molded articles. Any type of bottle can be made from the polyester compositions of the invention. Thus, in one embodiment, there is provided a beverage bottle suitable for holding water. In another embodiment, there is provided a heat-set beverage bottle suitable for holding beverages which are hot-filled into the bottle.

In yet another embodiment, the bottle is suitable for holding carbonated soft drinks. Further, in yet another embodiment, the bottle is suitable for holding alcoholic beverages.

In another aspect, the articles may comprise shaped articles, which is intended to include sheet, film, other kinds of extrusions, bottles, etc. as well as injection molded articles.

This invention can be further illustrated by the additional examples of embodiments thereof, although it will be understood that these examples are included merely for purposes of illustration and are not intended to limit the scope of the invention.

EXAMPLES

Experimental Procedures

Thermal Degradation Testing
Sample Preparation

The following procedure was conducted before analyzing each polymer sample. The polymer sample was dried overnight at a temperature approximately 10° C. below the polymer's Tg. Two grams (+/−0.01 gr.) of the dried polymer sample was weighed into a 20 ml screw top headspace vial (Drachrom part number 16-2000). The vial was fitted with a screw top (Drachrom part number 16-0050M) containing a silicone septum (Drachrom part number DC-0022). The screw top was tightened sufficiently to insure a good seal. Nitrogen was purged into the polymer containing vial by insertion of a 1.5" 18 gauge needle which was attached to the house nitrogen line. Another 18 gauge needle was inserted into the septum to allow the nitrogen to exhaust.

Each sample was purged with nitrogen for 2 minutes before testing. After 2 minutes, the exhaust needle was removed before the nitrogen purge needle to insure a minimal amount of oxygen would enter the vial. The screw cap of the vial was inserted into a Teflon sleeve that had been fabricated to fit snugly around the top of the screw cap. The Teflon sleeve was fabricated from a 1" diameter solid Teflon rod cut to 1.5" in length. A ¼" diameter hole was drilled completely through the Teflon sleeve for access to the vial. The ¼" diameter bore was increased to $^{11}/_{16}$" diameter ½" into the sleeve so the vial would fit snugly.

To insure that a nitrogen atmosphere was present, a ⅛" diameter hole was drilled through the side of the sleeve to the center of the sleeve which allowed a nitrogen purge tube to be inserted. A ⅛" diameter stainless steel tube was connected on one end to a nitrogen bubbler that provided atmospheric pressure nitrogen to the system when needed and inserted into the Teflon sleeve on the other end.

To heat the polymer samples, an aluminum solid stating block was modified in a manner that allowed the headspace vials to be inserted 2½" into the block. The block was wrapped with heating tape and attached to a Eurotherm controller which kept the temperature within 1° C. of the set point. The heating block was completely inserted into a cloth heating mantle to minimize heat loss and protect against burns.

The Agilent 3000A two channel Micro GC was connected to a $^1/_{16}$" OD stainless steel tube that was 16" in length. The other end of the tubing was inserted ½" into the vial through the septum in the screw cap. The tubing was used to transport the off-gasses from the heated polymer sample to the GC.

Agilent 3000A Micro GC Parameters

The Agilent 3000A two channel Micro GC used in the polymer off-gas analysis used Helium as the carrier gas and was connected to the house supply. EZChrom software was used to analyze the CO and $CO_2$. The Micro GC settings used in the polymer analyses are shown in the FIG. 1.

TABLE 1

Micro GC Settings

| | Channel A | Channel B |
|---|---|---|
| Column | Molsieve; 10 m × 320 μm × 12 μm | PlotQ; 10 m × 320 μm × 12 μm |
| Inject Time | 100 msec | 100 msec |
| Sample Pump | Timed 30 seconds | Timed 30 seconds |
| Sample Inlet | 100° C. | NA |
| Injector Temp | 90° C. | 90° C. |
| Sensitivity | High | High |
| Frequency | 20 Hz | 20 Hz |
| Acquisition Delay | 0 min | 0 min |
| Filament | On | On |
| Back Flush Time | 8 seconds | None |
| Trigger | None | None |

Instrument Calibration

To quantify the amount of CO and $CO_2$ given off by the molten polymer, the Micro GC needed to be calibrated by injecting known amounts of both gases. Cylinders were purchased from Air Products which contained from 100 ppm to 50,000 ppm of each gas. The carrier gas cylinders were attached to the GC and samples were analyzed in triplicate. The data obtained from analyzing the known gasses was used to establish a linear calibration curve for each gas. The CO linear correlation coefficient was 0.99953 and the $CO_2$ linear correlation coefficient was 0.99859. These linear calibration curves were used in the analysis of each of the polymer samples for CO and $CO_2$.

Equations used in Calculations of $CO_2$ & CO Generation Rate

The Micro GC obtained samples from the heated vial at 3½ minute intervals with the actual sampling portion of the analysis lasting 30 seconds. The reported results from each collected off-gas sample was additive to the previously attained sample minus the amount of off-gas that was lost in during sampling. Calculations were made to correct for these losses. The assumptions and measurements used in these calculations are as follows:

Assumptions Used for this Calculation:

PV=nRT is used extensively and all gasses are assumed to follow this Ideal Gas Law.

The volume of a vial (empty) was measured to be 20.3 mL and all vials were assumed to have this empty volume available for gas upon sealing. The volume of a vial loaded with 2 grams of polymer was estimated to be 18.5 mL and all vials were assumed to have this gas volume available when loaded with sample. (Note: direct measurement indicated there may be 0.1 mL additional gas volume; however, due to potential error in measuring, we continued to use the 18.5 estimate in all calculations requiring this volume).

The size of each sampling volume pulled by the GC using a 30 second sampling cycle was determined empirically. This was done by loading an empty vial with N2 containing CO and $CO_2$ and then sampling 7 times. The best fit for this data had a formula of:

$$CO_2 = 617e^{-0.1625} \quad (1)$$

$$CO = 836e^{-0.01165} \quad (2)$$

The value from the $CO_2$ plot was further "checked" by producing a plot of data created by starting with initial measured $CO_2$ concentration and calculating values by reducing each sampling by 15% of the prior one. This was plotted against the number of sampling and gave the same curve fitting parameters shown above for the $CO_2$ actual sampling curve. On this basis, it was estimated that each sampling removed 3.04 mL of gas from the vial (this was replaced by virgin $N_2$ via the atmospheric pressure $N_2$ supply described above).

A GC response factor was determined using CO and $CO_2$ in $N_2$ standards ranging from 100 ppm to 50,000 ppm at the beginning of this study. These calibration/response factors of 0.254*area=ppm CO and 0.158*area=ppm $CO_2$ were used for all reported results.

Strictly speaking an assumption that was made in calculating the amount of $CO_2$ & CO lost in each sampling was that the CO and $CO_2$ were distributed throughout the entire vial evenly. This is certainly a good assumption in the gas space due to rapid gas diffusion rates but could be questioned for the volume of the melt which is assumed to contain the same concentration of these gases for the purpose of these calculations.

Calculations of $CO_2$ & CO Generation Rates:

To calculate the amount of off-gas (CO or $CO_2$) given off from the sample at each sampling time, the measured ppm off-gas reported by GC were added to the estimated off-gas loss (this was estimated using the above assumptions) where 15% of the prior off-gas concentration was entered into cells. These were later summed for each sample time to estimate the total (what remained in the vial at each sample time plus what had been lost up to that point). These values are referred to as "corrected CO ppm" and "corrected $CO_2$ ppm".

The "corrected CO ppm" values were used in the following formula to convert these values to microgram CO/gram sample for each sampling time. Microgram CO/gram sample=((X1 mol fraction*X2 mmoles total gas in vial)*X3 molecular weight of gas, mg/mmole))/(X4=weight of sample, g) and this multiplied by 1000 to convert results into micrograms.

where:

X1=volume fraction of gas that is CO in vial (corrected CO ppm*1000000) since we have assumed these are all "ideal gases" this is also the mole fraction of CO in volume of gas in vial.

X2=number of mmoles of total gas in vial=(18.5 mL gas in vial)/(22.4 mL/mmol of ideal gas at STP)*(temperature correction factor of (273+300)/273)

X3=MW of CO=28 mg/mmol

X4=2 grams of sample charged to vial

To use this formula for $CO_2$ simply use 44 mg/mmol for X3.

To obtain off-gas generation rates, we plotted values obtained in the previous calculations (micrograms of off-gas/gram sample) vs. time in minutes that the sample was taken. We defined "Initial off-gas rate" as the slope of the least squares line of the data from time from injection=20 mins. to time=50 minutes (from initial injection). Note: the data from the initial 20 minutes was not included in slope calculation because little off-gas was generated/sampled during this period, presumably since sample was still heating up to target temperature (unless specified this target temperature was 300° C.). The "Final off-gas rate" was defined as the slope of the least squares line of the data from time from injection=50 minutes to time=90 minutes (from initial injection). These rates are expressed in units of micrograms of off-gas/minute/gram sample.

Examples 1-24

Oligomer Preparation—Pilot Plant Scale

An oligomeric material was first prepared from terephthalic acid (TPA), ethylene glycol (EG), and 1,4-cyclohexanedimethanol (CHDM). Synthesis was carried out in a 120-gallon HASTELLOY reactor fitted with three sets of turbine agitators and a heated reflux column. To the 120-gallon reactor under a 20 SCFH nitrogen purge and with the heated reflux column at 190° C., 702.24 gram-moles of EG and 148.68 gram-moles of CHDM were charged. The agitator was started and the TPA was slowly added.

The reactor was then pressurized to 45 psig using nitrogen gas and maintained at 45 psig throughout the esterification stage. Over a period of 14 hours and 10 minutes the temperature of the reaction mixture was ramped to 230° C. When the reaction mixture was 230° C. at 45 psig pressure, it was held for 80 minutes. Immediately after the 80 minute hold period, the temperature of the reaction mixture was increased to 250° C. When the reaction mixture was 250° C. at 45 psig, it was held for 70 minutes. After the 70 minute hold at 250° C. and 45 psig, the pressure was decreased to 10 psig. When the pressure was 10 psig, the reaction mixture was held at 250° C. and 10 psig for 20 minutes. After the 10 minute hold at 250° C. and 10 psig, the reactor pressure was reduced to 0 psig and the reactor was purged with 20 SCFH nitrogen.

The molten reaction mixture was drained into 5-gallon open-head metal buckets. The reaction mixture was allowed to cool to 23° C. The cooled reaction mixture was broken up and then ground in a grinder to <8-mm size.

By GC analysis the resulting oligomer material contained 68.72 mol % EG moiety, 27.37 mol % CHDM moiety, and 3.55 mol % diethylene glycol moiety.

Lab Scale Polymerization

Examples 1-24

Lab-scale polymerpreparation: Oligomer obtained from the process described above was charged to a series of 500-ml heavy walled, round-bottom flasks for polymerization. Catalyst loading for each sample is shown in the examples section.

Lithium and aluminum were charged as a solution in ethylene glycol made from lithium hydroxide monohydrate and aluminum isopropoxide. Titanium was charged as a solution in ethylene glycol made with titanium tetraisopropoxide. Catalyst solutions were added via syringe at the end of stage 2.

Merpol A, an aliphatic mixed phosphate ester, in ethylene glycol was added immediately after titanium when specified.

Phosphoric acid in diethyleneglycol dimethylether or tris (nonylphenyl)phosphite in diethyleneglycol dimethylether was added at the beginning of stage 12 when specified.

A stainless steel stirrer (2" diameter paddle) was next inserted into the flask and then each flask was fitted with a polymer adapter head. This head included a nipple for the attachment of a nitrogen purge line, a septum port for injection of additives, a smooth bore tubular section for the stirring shaft and two standard taper 24/40 male joints; one for insertion into the flask's female joint and the second, which is oriented at a 45° angle to the first, is connected to a section of glass tubing terminating at a vacuum condenser system. A Teflon tubular bushing was inserted into the smooth bore section of the adapter. The stainless steel stirring shaft was passed through the inner diameter of this bushing and a section of rubber hose was fitted around the stirring shaft and over the outside diameter of the glass tubing.

This assembly provided a low friction, vacuum tight seal between the stirring shaft and the adapter head of the reaction flask. The assembled apparatus was clamped into a polymerization "rig", and the stirring shaft connected to a ⅛ horsepower stirring motor. The polymerization rig included a molten metal bath which could be raised to provide heat input to the flask. The stirring motor could also be raised or lowered to ensure that the stirrer's blade was fully immersed in the molten oligomer/polymer as the reaction was carried out.

Typical melt phase polymerization reaction conditions are as shown in Table 2. Reaction parameters were monitored and controlled using a Camile® system.

TABLE 2

Lab scale polymerization recipe

| Stage | Time (min) | Temp (° C.) | Vacuum (torr) | Stir (rpm) |
|---|---|---|---|---|
| 1 | 0.1 | 265 | 760 | 0 |
| 2 | 5 | 265 | 760 | 30 |
| 3 | 5 | 265 | 130 | 100 |
| 4 | 73 | 265 | 130 | 100 |
| 5 | 3 | 265 | 3 | 100 |
| 6 | 70 | 270 | 3 | 100 |
| 7 | 2 | 278 | 0.3 | 50 |
| 8 | 60 | 278 | 0.3 | 50 |
| 9 | 2 | 278 | 650 | 50 |
| 10 | 1 | 278 | 650 | 50 |
| 11 | 1 | 278 | 140 | 50 |
| 12 | 5 | 278 | 140 | 50 |
| 13 | 2 | 300 | 400 | 0 |
| 14 | 2 | 300 | 760 | 0 |

At the end of the reaction sequence the metal bath was lowered and the polymer mass was allowed to cool. After 45 minutes the polymer had solidified and the heating bath was raised to re-melt the polymer and permit it to be pulled free of the flask walls. After cooling for an additional fifteen minutes the flask was broken and the solid polymer mass was immersed into liquid nitrogen. The cold polymer mass was removed from the stirring rod using a hydraulic ram fitted with a chisel attachment. The collected pieces of polymer were cooled again in liquid nitrogen and finally ground in a Wiley mill. The mill was fitted with a screen having 3-mm diameter holes.

Catalyst metal and phosphorus content were determined by ICP analysis. IhV was determined by the standard Eastman method involving dissolution in PM95. Color was measured on ground polymer using a HunterLab UltraScan XE colorimeter.

From the results in Table 3, it can be seen that in Examples 1-24, the use of lithium and aluminum as catalysts, when deactivated with a phosphorus-containing compound, resulted in less yellow copolyester than the use either of titanium catalysts or lithium and aluminum used in the absence of a phosphorus-containing compound. Note also that the amounts of Li and Al were chosen to have catalytic activity similar to the titanium catalyzed comparative examples as evidenced by similar final IhV measurements.

Further, it can be seen from Table 4 that of the samples tested for thermal degradation (Examples 1, 3, 9, 5, and 17), the use of lithium and aluminum as catalysts, when deactivated with a phosphorus-containing compound, resulted in significantly less off gas from the copolyesters under the given test conditions than did the use either of titanium catalyst or of lithium and aluminum used in the absence of a phosphorus-containing compound.

TABLE 3

Lab scale polymerization data

| Ex. | Li (ppm) | Al (ppm) | Ti (ppm) | P (ppm) | P-type | IhV | L* | a* | b* |
|---|---|---|---|---|---|---|---|---|---|
| C1 | 0 | 0 | 16 | 50 | Merpol-A | 0.761 | 82.3 | −2.68 | 8.47 |
| C2 | 0 | 0 | 17 | 50 | Merpol-A | 0.753 | 76.5 | −2.33 | 6.75 |
| C3 | 7 | 17 | 0 | 0 | — | 0.790 | 83.2 | 1.92 | 4.99 |
| C4 | 9 | 20 | 0 | 0 | — | 0.779 | 75.8 | −1.41 | 3.66 |
| 5 | 7 | 21 | 0 | 49 | $H_3PO_4$ | 0.750 | 78.0 | −1.11 | 5.06 |
| 6 | 8 | 19 | 0 | 47 | $H_3PO_4$ | 0.730 | 79.0 | −1.32 | 5.99 |
| 7 | 8 | 23 | 0 | 53 | $H_3PO_4$ | 0.723 | 77.3 | −0.99 | 4.70 |
| 8 | 8 | 19 | 0 | 52 | $H_3PO_4$ | 0.752 | 77.6 | −1.12 | 4.39 |
| 9 | 8 | 19 | 0 | 31 | $H_3PO_4$ | 0.772 | 78.3 | −1.24 | 4.41 |
| 10 | 8 | 17 | 0 | 31 | $H_3PO_4$ | 0.755 | 75.0 | −1.03 | 3.96 |
| 11 | 8 | 17 | 0 | 20 | $H_3PO_4$ | 0.776 | 79.6 | −1.92 | 5.73 |
| 12 | 8 | 19 | 0 | 21 | $H_3PO_4$ | 0.763 | 80.1 | −1.79 | 5.40 |
| 13 | 6 | 38 | 0 | 28 | $H_3PO_4$ | 0.747 | 80.5 | −1.42 | 4.80 |
| 14 | 5 | 34 | 0 | 28 | $H_3PO_4$ | 0.727 | 82.0 | −1.51 | 4.9 |
| 15 | 11 | 24 | 0 | 42 | $H_3PO_4$ | 0.768 | 78.7 | −1.05 | 4.79 |
| 16 | 11 | 23 | 0 | 41 | $H_3PO_4$ | 0.748 | 82.9 | −1.40 | 5.50 |
| 17 | 8 | 19 | 0 | 52 | TNPP | 0.741 | 75.5 | −1.42 | 4.53 |
| 18 | 8 | 22 | 0 | 53 | TNPP | 0.777 | 80.4 | −2.05 | 5.05 |
| C19 | 0 | 0 | 18 | 42 | Merpol-A | 0.758 | 74.8 | −2.06 | 4.73 |
| C20 | 0 | 0 | 18 | 45 | Merpol-A | 0.772 | 78.7 | −2.68 | 5.03 |
| C21 | 0 | 0 | 18 | 48 | Merpol-A | 0.778 | 75.1 | −2.41 | 4.60 |
| 22 | 9 | 22 | 0 | 24 | $H_3PO_4$ | 0.745 | 76.3 | −1.31 | 2.54 |
| 23 | 9 | 21 | 0 | 24 | $H_3PO_4$ | 0.750 | 71.2 | −0.99 | 2.56 |
| 24 | 9 | 19 | 0 | 25 | $H_3PO_4$ | 0.740 | 77.9 | −1.21 | 2.03 |

TABLE 4

Thermal degradation results - lab scale polymers

| Experiment # | Li (ppm) | Al (ppm) | Ti (ppm) | P (ppm) | P-type | IhV | Off gas rate (μg/g/min) |
|---|---|---|---|---|---|---|---|
| C1 | 0 | 0 | 16 | 50 | Merpol-A | 0.761 | 8.23 |
| C3 | 7 | 17 | 0 | 0 | — | 0.790 | 8.02 |
| 9 | 8 | 18 | 0 | 31 | $H_3PO_4$ | 0.772 | 4.71 |
| 5 | 7 | 20 | 0 | 49 | $H_3PO_4$ | 0.750 | 2.61 |
| 17 | 8 | 19 | 0 | 52 | TNPP | 0.741 | 5.60 |

Examples 25-27

Pilot Plant Polymerizations

Example 25

A copolyester was prepared from terephthalic acid (TPA), ethylene glycol (EG), and 1,4-cyclohexanedimethanol (CHDM). Synthesis was carried out in an 18-gallon stainless steel reactor which was fitted with twin intermeshing spiral agitators and a heated reflux column. To the 18-gallon reactor under a 10 SCFH nitrogen purge, with the heated reflux column at 190° C., and with the agitator running in reverse direction (lifting mode), 62.63 gram-moles of TPA, 105.85 gram-moles of EG, and 20.67 gram-moles of CHDM were charged.

The mixture was agitated for 30 minutes before proceeding. The reactor was then pressurized to 45 psig using nitrogen gas and maintained at 45 psig throughout the esterification stage. Over a period of 2 hours and 50 minutes the temperature of the reaction mixture was ramped to 250° C. When the reaction mixture was 250° C. at 45 psig pressure, it was held for 10 minutes. Immediately after the 10 minute hold period, the reactor pressure was ramped to 0 psig at a rate of 3 psig/minute.

When the pressure was 0 psig, the reactor was purged with 10 SCFH nitrogen. Then from a catalyst blow pot a sufficient Li/Al catalyst in EG solution (Li from LiOH.$H_2$O and Al from Al($O^iPr$)$_3$) was charged to the reaction mixture to provide 7 ppm Li and 21 ppm Al. The agitator was set to stir in the forward direction (pumping down mode; 6 minute cycle) and in the reverse direction (lifting mode; 6 minute cycle) at 25 RPM. The reaction mixture was set to heat to 265° C. At the same time the nitrogen purge was stopped and with a vacuum pump the pressure was ramped down at 13-mm/minute to 140-mm. When the reaction mixture was 265° C. and the pressure was 140-mm, a hold period of 60 minutes was started.

After the 60 minute hold period at 265° C. and 140-mm, the reaction mixture was heated to 270° C. and the pressure was reduced to 1-mm. When the reaction mixture was 270° C. and the pressure was 1-mm, a hold period of 40 minutes was started. After the 40 minute hold period at 270° C. and 1-mm, the agitator was set to 15 RPM (forward direction, 6 minute cycle/reverse direction, 6 minute cycle) and the reactor pressure was reduced to <0.5-mm. The reaction mixture was held at 270° C. and <0.5-mm pressure for 2 hours and 25 minutes. Immediately after the 2 hour and 25 minute hold time at 270° C. and 0.5-mm, the reactor pressure was increased to 200-mm.

When the pressure was 200-mm, sufficient 85% phosphoric acid in diethylene glycol dimethyl ether solution (2.04 grams 85% phosphoric acid in 15 grams diethylene glycol dimethyl ether) was charged to the molten reaction mixture to provide 40 ppm P. The molten reaction mixture at 270° C. was then agitated for 5 minutes at 15 RPM. Immediately after agitating for 5 minutes, the reactor pressure was increased to 0 psig with nitrogen and the molten reaction mixture was extruded from the reactor through a 2-hole extrusion die. The molten rods were pulled through a cold water bath to solidify them. The rods were chopped into approximately ⅛-inch pellets using a chopper.

By ICP analysis, the resulting polymer contained 7.2 ppm Li catalyst, 22.5 ppm Al catalyst, and 36.2 ppm P. The resulting pelletized polymer had an inherent viscosity value of 0.590. By GC analysis the polymer contained 65.09 mol % EG moiety, 30.54 mol % CHDM moiety, and 3.67 mol % diethylene glycol moiety. The polymer pellets had an "L* color" value of 66.38, an "a* color value" of −1.81 and a "b* color" value of 6.77.

Example 26

A copolyester was prepared from terephthalic acid (TPA), ethylene glycol (EG), and 1,4-cyclohexanedimethanol (CHDM). Synthesis was carried out in an 18-gallon stainless steel reactor which was fitted with twin intermeshing spiral agitators and a heated reflux column. To the 18-gallon reactor under a 10 SCFH nitrogen purge, with the heated reflux column at 190° C., and with the agitator running in reverse direction (lifting mode), 62.63 gram-moles of TPA, 105.85 gram-moles of EG, and 20.67 gram-moles of CHDM were charged.

The mixture was agitated for 30 minutes before proceeding. The reactor was then pressurized to 45 psig using nitrogen gas and maintained at 45 psig throughout the esterification stage. Over a period of 2 hours and 30 minutes the temperature of the reaction mixture was ramped to 250° C. When the reaction mixture was 250° C. at 45 psig pressure, it was held for 10 minutes. Immediately after the 10 minute hold period, the reactor pressure was ramped to 0 psig at a rate of 3 psig/minute.

When the pressure was 0 psig, the reactor was purged with 10 SCFH nitrogen. Then from a catalyst blow pot a sufficient Li/Al catalyst in EG solution (Li from LiOH.$H_2$O and Al from Al(O$^i$Pr)$_3$) was charged to the reaction mixture to provide 7 ppm Li and 21 ppm Al. The agitator was set to stir in the forward direction (pumping down mode; 6 minute cycle) and in the reverse direction (lifting mode; 6 minute cycle) at 25 RPM. The reaction mixture was set to heat to 265° C. At the same time the nitrogen purge was stopped and with a vacuum pump the pressure was ramped down at 13-mm/minute to 140-mm. When the reaction mixture was 265° C. and the pressure was 140-mm, a hold period of 60 minutes was started.

After the 60 minute hold period at 265° C. and 140-mm, the reaction mixture was heated to 270° C. and the pressure was reduced to 1-mm. When the reaction mixture was 270° C. and the pressure was 1-mm, a hold period of 40 minutes was started. After the 40 minute hold period at 270° C. and 1-mm, the agitator was set to 15 RPM (forward direction, 6 minute cycle/reverse direction, 6 minute cycle) and the reactor pressure was reduced to <0.5-mm. The reaction mixture was held at 270° C. and <0.5-mm pressure for 2 hours and 25 minutes. Immediately after the 2 hour and 25 minute hold time at 270° C. and 0.5-mm, the reactor pressure was increased to 200-mm.

When the pressure was 200-mm, sufficient tris-(nonyl phenyl)phosphite in diethylene glycol dimethyl ether solution (12.1 grams tris-(nonyl phenyl)phosphite in 15.0 grams diethylene glycol dimethyl ether) was charged to the molten reaction mixture to provide 40 ppm P. The molten reaction mixture at 270° C. was then agitated for 5 minutes at 15 RPM. Immediately after agitating for 5 minutes, the reactor pressure was increased to 0 psig with nitrogen and the molten reaction mixture was extruded from the reactor through a 2-hole extrusion die. The molten rods were pulled through a cold water bath to solidify them. The rods were chopped into approximately ⅛-inch pellets using a chopper.

By ICP analysis, the resulting polymer contained 6.5 ppm Li catalyst, 23.0 ppm Al catalyst, and 32.9 ppm P. The resulting pelletized polymer had an inherent viscosity value of 0.646. By GC analysis the polymer contained 65.39 mol % EG moiety, 30.63 mol % CHDM moiety, and 3.79 mol % diethylene glycol moiety. The polymer pellets had an "L* color" value of 65.98, an "a* color value" of −2.21 and a "b* color" value of 7.81.

Example 27

A copolyester was prepared from terephthalic acid (TPA), ethylene glycol (EG), and 1,4-cyclohexanedimethanol (CHDM). Synthesis was carried out in an 18-gallon stainless steel reactor which was fitted with twin intermeshing spiral agitators and a heated reflux column. To the 18-gallon reactor under a 10 SCFH nitrogen purge, with the heated reflux column at 190° C., and with the agitator running in reverse direction (lifting mode), 62.63 gram-moles of TPA, 105.85 gram-moles of EG, and 20.67 gram-moles of CHDM were charged.

The mixture was agitated for 30 minutes before proceeding. The reactor was then pressurized to 45 psig using nitrogen gas and maintained at 45 psig throughout the esterification stage. Over a period of 2 hours and 50 minutes the temperature of the reaction mixture was ramped to 250° C. When the reaction mixture was 250° C. at 45 psig pressure, it was held for 10 minutes. Immediately after the 10 minute hold period, the reactor pressure was ramped to 0 psig at a rate of 3 psig/minute.

When the pressure was 0 psig, the reactor was purged with 10 SCFH nitrogen. Then from a catalyst blow pot a sufficient Ti catalyst in n-butanol solution (Ti from titanium(IV) isopropoxide) was charged to the reaction mixture to provide 16 ppm Ti. After adding the Ti catalyst the reaction mixture was held 10 minutes at 250° C. and 0 psig. After the 10 minute hold period, sufficient MERPOL-A was charged to the reaction mixture to provide 50 ppm P. The agitator was set to stir in the forward direction (pumping down mode; 6 minute cycle) and in the reverse direction (lifting mode; 6 minute cycle) at 25 RPM. The reaction mixture was set to heat to 265° C. At the same time the nitrogen purge was stopped and with a vacuum pump the pressure was ramped down at 13-mm/minute to 140-mm. When the reaction mixture was 265° C. and the pressure was 140-mm, a hold period of 60 minutes was started.

After the 60 minute hold period at 265° C. and 140-mm, the reaction mixture was heated to 270° C. and the pressure was reduced to 1-mm. When the reaction mixture was 270° C. and the pressure was 1-mm, a hold period of 40 minutes was started. After the 40 minute hold period at 270° C. and 1-mm, the agitator was set to 15 RPM (forward direction, 6 minute cycle/reverse direction, 6 minute cycle) and the reactor pressure was reduced to <0.5-mm. The reaction mixture was held at 270° C. and <0.5-mm pressure for 3 hours and 45 minutes. After the 3 hour and 45 minute hold time at 270° C. and 0.5-mm, the reactor pressure was increased to 0 psig with nitrogen and the molten reaction mixture was extruded from the reactor through a 2-hole extrusion die. The molten rods were pulled through a cold water bath to solidify them. The rods were chopped into approximately ⅛-inch pellets using a chopper.

By x-ray florescence analysis the resulting polymer contained 19 ppm Ti catalyst and 43 ppm P. The resulting pelletized polymer had an inherent viscosity value of 0.656. By GC analysis the polymer contained 67.97 mol % EG moiety, 30.75 mol % CHDM moiety, and 3.68 mol % diethylene glycol moiety. The polymer pellets had an "L* color" value of 61.66, an "a* color value" of −0.77 and a "b* color" value of 12.30.

TABLE 5

Pilot plant results

| Exp. # | Li (ppm) | Al (ppm) | Ti (ppm) | P (ppm) | P-type | EG mol % | CHDM mol % | DEG mol % | IhV | L* | a* | b* |
|---|---|---|---|---|---|---|---|---|---|---|---|---|
| 25 | 7.2 | 22.5 | 0 | 36.2 | $H_3PO_4$ | 65.1 | 30.5 | 3.7 | 0.600 | 66.4 | −1.81 | 6.77 |
| 26 | 6.5 | 23.0 | 0 | 32.9 | TNPP | 65.4 | 30.6 | 3.8 | 0.646 | 66.0 | −2.21 | 7.81 |
| C27 | 0 | 0 | 19 | 43 | Merpol-A | 68.0 | 30.8 | 3.7 | 0.662 | 61.7 | −0.77 | 12.30 |

It can be seen from Table 5 that the use of lithium and aluminum as catalysts, when deactivated with a phosphorus-containing compound, resulted in less yellow copolyester than did the use of titanium catalyst.

TABLE 6

Thermal degradation results - pilot plant polymers

| Experiment # | Li (ppm) | Al (ppm) | Ti (ppm) | P (ppm) | P-type | IhV | Off gas rate (µg/g/min) |
|---|---|---|---|---|---|---|---|
| 25 | 7.2 | 22.5 | 0 | 36.2 | $H_3PO_4$ | 0.600 | 3.29 |
| 26 | 6.5 | 23.0 | 0 | 32.9 | TNPP | 0.646 | 3.24 |
| C27 | 0 | 0 | 19 | 43 | Merpol-A | 0.662 | 4.37 |

Further, it can be seen from Table 6 that the use of lithium and aluminum as catalysts, when deactivated with a phosphorus-containing compound, resulted in significantly less off gas under the given test conditions than did the use of titanium catalyst.

Examples 28 and 29

Examples 28 and 29 were preparation of oligomer in the presence and absence of lithium. These examples were intended to mimic the esterification step of copolyester preparation, the step during which much of the DEG as a product of polymerization is created. Examples 28 and 29 included the following:

Terephthalic Acid: 1661.3 grams, 10.0 moles

Ethylene Glycol: 1049.0 grams, 16.9 moles

CHDM: 475.9 grams, 3.3 moles

Experiment 29 only:

$LiOH.H_2O$: 75 mg

Both batches were analyzed for DEG content by gas chromatography.

Parr Oligomer Preparation

A slurry containing TPA (10 mols), EG (16.9 mols), CHDM (3.3) and catalyst was charged to an 8 L batch reactor equipped with an overhead stirrer and condenser. The reactor was purged with nitrogen, stirred, and pressurized to $4.1 \times 10^5$ Pa. The reaction mixture was heated to 230° C. over a 65 minute time period and held for an additional 20 minutes. At the conclusion of this hold time, the reaction mixture was heated to 250° C. over 30 minutes and held for an additional 60 minutes. The pressure was reduced slowly to atmospheric and reactor contents cooled.

TABLE 7

Oligomer preparation recipe

| Stage | Time (min) | Temp (° C.) | Pressure (psig) | Stir (rpm) | Column Temp (° C.) |
|---|---|---|---|---|---|
| 1-Ramp | 1 | 100 | 45 | 25 | 150 |
| 2-Hold | 1 | 100 | 45 | 25 | 150 |
| 3-Ramp | 65 | 230 | 45 | 25 | 150 |
| 4-Hold | 20 | 230 | 45 | 25 | 150 |
| 5-Ramp | 30 | 250 | 45 | 25 | 150 |
| 6-Hold | 60 | 250 | 45 | 25 | 150 |

TABLE 8

Small batch oligomer results

| Example | Li (ppm) | DEG weight percent |
|---|---|---|
| 28 | 0 | 2.01 |
| 29 | 5.5 | 0.86 |

It can be seen from the results in Table 8 that the oligomer prepared in the presence of lithium contained significantly less DEG than did the oligomer prepared in the absence of lithium.

What we claim is:

1. A process for producing a polyethylene terephthalate copolyester, comprising:
   esterifying a mixture of at least terephthalic acid, from 25 mole percent to 45 mole percent 1,4-cyclohexanedimethanol, and ethylene glycol, optionally in the presence of one or more alkaline earth metals or alkali metals, to form an oligomer;
   polycondensing the oligomer in the melt phase in the presence of aluminum and one or more alkaline earth metals or alkali metals, to obtain a copolyester having an intrinsic viscosity of at least 0.5 dL/g, as calculated from the inherent viscosity (Ih.V.) measured at 25° C. in 60/40 wt/wt phenol/tetrachloroethane; and
   thereafter adding to the copolyester a phosphorus-containing compound.

2. The process of claim 1, wherein the amount of terephthalic acid in the esterifying step is at least 95 mole percent.

3. The process of claim 1, wherein the amount of terephthalic acid in the esterifying step is at least 99 mole percent.

4. The process of claim 1, wherein the amount of 1,4-cyclohexane-dimethanol in the esterifying step is from 25 mole percent to 40 mole percent.

5. The process of claim 1, wherein the amount of diethylene glycol in the copolyester is no greater than 2 mole percent.

6. The process of claim 1, wherein the amount of diethylene glycol in the copolyester is no greater than 1 mole percent.

7. The process of claim 1, wherein the one or more alkaline earth metals or alkali metals are present in the esterifying step in an amount to provide from 2 ppm to 20 ppm alkaline earth metal or alkali metal atoms in the copolyester obtained.

8. The process of claim 1, wherein the one or more alkaline earth metals or alkali metals are present in the esterifying step in an amount to provide from 3 ppm to 10 ppm alkaline earth metal or alkali metal atoms in the copolyester obtained.

9. The process of claim 1, wherein the aluminum is present in the polycondensing step in an amount from 3 ppm to 150 ppm, based on the weight of the copolyester obtained.

10. The process of claim 1, wherein the aluminum is present in the polycondensing step in an amount from 5 ppm to 100 ppm, based on the weight of the copolyester obtained.

11. The process of claim 1, wherein the aluminum is provided as aluminum isopropoxide.

12. The process of claim 1, wherein the aluminum and the one or more alkaline earth metals or alkali metals are provided to the polycondensing step as a mixture of aluminum isopropoxide and lithium hydroxide monohydrate.

13. The process of claim 1, wherein the one or more alkaline earth metals or alkali metals comprise lithium, present in the polycondensing step in an amount from 4 ppm to 300 ppm.

14. The process of claim 1, wherein the one or more alkaline earth metals or alkali metals comprise lithium, present in the polycondensing step in an amount from 6 ppm to 150 ppm.

15. The process of claim 1, wherein the phosphorus-containing compound is added to the copolyester in an amount from 10 ppm to 300 ppm.

16. The process of claim 1, wherein the phosphorus-containing compound is added to the copolyester in an amount from 20 ppm to 200 ppm.

17. The process of claim 1, wherein the phosphorus-containing compound is added to the copolyester when the intrinsic viscosity of the copolyester is at least 0.6 dL/g.

18. The process of claim 1, wherein the phosphorus-containing compound is added to the copolyester in an amount such that the mole ratio of the phosphorus to the total amount of the aluminum and the alkaline earth metals and the alkali metals in the copolyester is from 0.5:1 to 5:1.

19. The process of claim 1, wherein the phosphorus-containing compound is phosphoric acid.

20. The process of claim 1, wherein the phosphorus-containing compound is tris(nonylphenyl)phosphite.

21. A polyethylene terephthalate copolyester produced according to the process of claim 1.

22. A shaped article comprising the polyethylene terephthalate copolyester of claim 21.

* * * * *